US011658914B2

(12) United States Patent
Loehr et al.

(10) Patent No.: US 11,658,914 B2
(45) Date of Patent: *May 23, 2023

(54) SUPPORT OF QUALITY OF SERVICE FOR V2X TRANSMISSIONS

(71) Applicant: Panasonic Intellectual Property Corporation of America, Torrance, CA (US)

(72) Inventors: Joachim Loehr, Hessen (DE); Prateek Basu Mallick, Hessen (DE); Takako Hori, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/242,626

(22) Filed: Apr. 28, 2021

(65) Prior Publication Data

US 2021/0250302 A1    Aug. 12, 2021

Related U.S. Application Data

(63) Continuation of application No. 16/929,944, filed on Jul. 15, 2020, now Pat. No. 11,025,554, which is a (Continued)

(30) Foreign Application Priority Data

Jul. 18, 2016   (EP) .................................... 16179995

(51) Int. Cl.
*H04W 4/00* (2018.01)
*H04L 47/32* (2022.01)
(Continued)

(52) U.S. Cl.
CPC .............. *H04L 47/32* (2013.01); *G06F 21/43* (2013.01); *H04L 5/0058* (2013.01); *H04L 47/11* (2013.01);
(Continued)

(58) Field of Classification Search
CPC ....... H04W 72/04; H04W 4/70; H04W 76/14; H04W 72/02; H04W 72/10; H04W 72/08
See application file for complete search history.

(56) References Cited

U.S. PATENT DOCUMENTS 9,147,294 B1    9/2015 Weinfield
10,638,455 B2   4/2020 Agiwal et al.
(Continued)

FOREIGN PATENT DOCUMENTS

CN       105120435 A     12/2015
KR    10-2015-0049489 A   5/2015
(Continued)

OTHER PUBLICATIONS

Huawei et al., R2-162286, Support of QoS for PC5-based V2V transport, 3GPP TSG RAN WG2 #93bis(Apr. 2, 2016. 3GPP).
(Continued)

*Primary Examiner* — Omoniyi Obayanju
(74) *Attorney, Agent, or Firm* — Seed IP Law Group LLP

(57)    ABSTRACT

The present disclosure relates to a transmitting device for transmitting vehicular data via a sidelink interface to one or more receiving devices. The transmitting device performs autonomous radio resource allocation for transmitting the vehicular data via the sidelink interface. An application layer generates the vehicular data and forwards the vehicular data together with a priority indication and one or more quality of service parameters to a transmission layer responsible for transmission of the vehicular data via the sidelink interface. The transmission layer performs autonomous radio resource (Continued)

allocation based on the received priority indication and the one or more quality of service parameters. The transmission layer transmits the vehicular data via the sidelink interface to the one or more receiving devices according to the performed autonomous radio resource allocation.

16 Claims, 9 Drawing Sheets

Related U.S. Application Data continuation of application No. 16/224,519, filed on Dec. 18, 2018, now Pat. No. 10,757,030, which is a continuation of application No. PCT/JP2017/018128, filed on May 15, 2017.

(51) Int. Cl.

| | | |
|---|---|---|
| *G06F 21/43* | (2013.01) | |
| *H04L 5/00* | (2006.01) | |
| *H04L 69/321* | (2022.01) | |
| *H04W 4/40* | (2018.01) | |
| *H04L 67/61* | (2022.01) | |
| *H04W 4/70* | (2018.01) | |
| *H04L 47/11* | (2022.01) | |
| *H04L 47/24* | (2022.01) | |
| *H04W 28/02* | (2009.01) | |
| *H04W 72/10* | (2009.01) | |
| *H04W 4/10* | (2009.01) | |
| *H04W 4/80* | (2018.01) | |

(52) U.S. Cl.
CPC .............. *H04L 47/24* (2013.01); *H04L 67/61* (2022.05); *H04L 69/321* (2013.01); *H04W 4/40* (2018.02); *H04W 4/70* (2018.02); *H04W 28/0284* (2013.01); *H04W 72/10* (2013.01); *H04W 4/10* (2013.01); *H04W 4/80* (2018.02)

(56) References Cited

U.S. PATENT DOCUMENTS

| | | | |
|---|---|---|---|
| 2010/0248618 A1 | 9/2010 | Bai et al. | |
| 2015/0195827 A1 | 7/2015 | Feng et al. | |
| 2015/0282210 A1 | 10/2015 | Li et al. | |
| 2015/0334721 A1 | 11/2015 | Kim et al. | |
| 2016/0381491 A1* | 12/2016 | Watfa ................... | H04W 8/005 455/41.2 |
| 2016/0381620 A1* | 12/2016 | Panaitopol ............ | H04W 40/02 370/315 |
| 2017/0041902 A1* | 2/2017 | Sheng ................... | H04W 72/02 |
| 2017/0353819 A1 | 12/2017 | Yin et al. | |
| 2018/0124633 A1 | 5/2018 | Hwang et al. | |
| 2019/0053215 A1* | 2/2019 | Yu ....................... | H04B 7/15542 |

FOREIGN PATENT DOCUMENTS

| | | |
|---|---|---|
| RU | 2 286 646 C2 | 10/2006 |
| RU | 2 373 658 C2 | 11/2009 |
| WO | 2016/078684 A1 | 5/2016 |

OTHER PUBLICATIONS

ZTE, R2-163819, QoS handling for PC5-based V2V transmission, 3GPP TSG RAN WG2 #94(May 13, 2016. 3GPP).
3GPP TSG-RAN WG2 #93bis, R2-162486, "Discussions on Sensing Mechanism for V2V Mode 2 Resource Allocation", Apr. 2016.
3GPP TSG-RAN WG2 #93bis, R2-162831, "On sensing with semi-persistent transmission for V2V sidelink", Apr. 2016.
3GPP TS 36.211 version 13.1.0 Release 13), "LTE; Evolved Universal Terrestrial Radio Access (E-UTRA); Physical channels and modulation", Apr. 2016.
3GPP TS 36.321 version 13.1.0 Release 13), "LTE; Evolved Universal Terrestrial Radio Access (E-UTRA); Medium Access Control (MAC) protocol specification", Apr. 2016.
3GPP TS 36.213 version 13.1.1 Release 13), "LTE; Evolved Universal Terrestrial Radio Access (E-UTRA); Physical layer procedures", May 2016.
3GPP TS 36.212 version 13.1.0 Release 13), "LTE; Evolved Universal Terrestrial Radio Access (E-UTRA); Multiplexing and channel coding", Apr. 2016.
3GPP TS 23.203 V14.0.0, "3rd Generation Partnership Project; Technical Specification Group Services and System Aspects; Policy and charging control architecture (Release 14)", Jun. 2016.
3GPP TR 23.713 V13.0.0, "3rd Generation Partnership Project; Technical Specification Group Services and System Aspects; Study on extended architecture support for proximity-based services (Release 13)", Sep. 2015.
3GPP TS 36.300 version 13.3.0 Release 13), "LTE; Evolved Universal Terrestrial Radio Access (E-UTRA) and Evolved Universal Terrestrial Radio Access Network (E-UTRAN); Overall description; Stage 2", Apr. 2016.
3GPP TS 23.303 V13.4.0, "3rd Generation Partnership Project; Technical Specification Group Services and System Aspects; Proximity-based services (ProSe); Stage2 (Release 13)", Jun. 2016.
3GPP TR 21.905 V13.0.0, "3rd Generation Partnership Project; Technical Specification Group Services and System Aspects; Vocabulary for 3GPP Specifications (Release 13)", Dec. 2015.
3GPP TSG-RAN WG2 Meeting #94, R2-163811, "Support of QoS for PC5-based V2V transport", May 2016.
3GPP TSG- RAN WG2 Meeting #93, R2-161101, "QoS Support for V2X transmission", Feb. 2016.
3GPP TSG-SA2 Meeting #114, S2-161527, "Solution for Key Issue#4 and Key Issue#7 for PC5 based V2X message transmission", Apr. 2016.
3GPP TSG-RAN WG2 #92, Tdoc R2-156635, "Traffic management in V2X", Nov. 2015.
ETSI EN 302 637-2 V1.3.1, "Intelligent Transport Systems (ITS); Vehicular Communications; Basic Set of Applications; Part 2: Specification of Cooperative Awareness Basic Service", Sep. 2014.
ETSI EN 302 637-3 V1.2.1, "Intelligent Transport Systems (ITS); Vehicular Communications; Basic Set of Applications; Part 3: Specifications of Decentralized Environmental Notification Basic Service", Sep. 2014.
Ericsson, "QoS enhancements for sidelink and Uu," R2-162817, Agenda Item: 8.11.3, 3GPP TSG-RAN WG2 #93bis, Dubrovnik, Croatia, Apr. 11-15, 2016, 5 pages.
Ericsson, "Congestion Control in V2X Sidelink," R2-164106, Agenda Item: 8.2.3, 3GPP TSG-RAN WG2 #94, Nanjing, China, May 23-27, 2016, 7 pages.
Ericsson, "QoS enhancements for V2X including non-IP data," S2-161580, Agenda Item: 6.13, SA WG2 Meeting #114, Sophia Antipolis, France, Apr. 11-15, 2016, 5 pages.
Huawei, HiSilicon, "QoS Support for V2X transmission," R2-161101, Agenda Item: 7.11, 3GPP TSG-RAN WG2 Meeting #93, Malta, Feb. 15-19, 2016, 5 pages.
Huawei, HiSilicon, "QoS Requirements for V2X transmission," R2-162284, Agenda Item: 8.2.1, 3GPP TSG-RAN WG2 Meeting #93bis, Dubrovnik, Croatia, Apr. 11-15, 2016, 5 pages.
Huawei, HiSilicon, "Support of QoS for PC5-based V2V transport," R2-163811, Agenda Item: 8.2.3, 3GPP TSG-RAN WG2 Meeting #94, Nanjing, China, May 23-27, 2016, 6 pages.
Huawei, Hisilicon, "QoS architecture for PC5 based V2X messages," S2-161648, Agenda Item: 6.13, SA WG2 Meeting #114, Sophia Antipolis, France, Apr. 11-15, 2016, 4 pages.
Huawei, HiSilicon, "Update and conclusion of Solution 6," S2-162540, Agenda Item: 6.13, SA WG2 Meeting #115, Nanjing, China, May 23-27, 2016, 7 pages.
International Search Report of PCT application No. PCT/JP2017/018128 dated Jul. 25, 2017.

(56) References Cited

OTHER PUBLICATIONS

SA WG2 Meeting #115, S2-162540, "Update and conclusion of Solution 6", May 2016.

* cited by examiner

SUPPORT OF QUALITY OF SERVICE FOR V2X TRANSMISSIONS

BACKGROUND

1. Technical Field

The present disclosure relates to improved QoS support for transmitting vehicular data via the sidelink interface. The present disclosure is providing the corresponding (vehicular) mobile terminal, the base station and corresponding methods.

2. Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g. parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} \times N^{RB}_{SC}$ subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $N^{min,DL}_{RB} \leq N^{DL}_{RB} \leq N^{max,DL}_{RB}$, where $N^{min,DL}_{RB}=6$ and $N^{max,DL}{}_{RB}$=110 are respectively the smallest and the largest downlink bandwidths, supported by the current version of the specification. $N^{RB}{}_{SC}$ is the number of subcarriers within one resource block. For normal cyclic prefix subframe structure, $N^{RB}{}_{SC}$=12 and $N^{DL}{}_{symb}$=7.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g. 7 OFDM symbols) and consecutive subcarriers in the frequency domain as exemplified in FIG. 2 (e.g. 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 13.1.0 (3GPP TS 36.211, version 13.1.0), section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g. barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)—compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g. the 3GPP technical standard TS 36.321, current version 13.1.0 (3GPP TS 36.321, version 13.1.0). The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g. RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e. the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e. the modulation and coding scheme, MCS), the number of physical resource blocks etc. More information on the functioning of the physical layer can be found in the 3GPP technical standard 36.213 current version 13.1.1 (3GPP TS 36.213, version 13.1.1), incorporated herein by reference.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signalling Radio Bearer (SRBs) and of radio bearers carrying user data (Data Radio Bearers, DRBs).

The radio link control (RLC) sublayer comprises mainly ARQ functionality and supports data segmentation and concatenation, i.e. RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e. RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size BWgrant during one time interval, e.g. a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g. Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e. resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g. an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v13.1.0 (3GPP TS 36.212, version v13.1.0) available at http://www.3gpp.org and incorporated herein by reference). The 3GPP technical standard TS 36.212, current version 13.1.0, defines in subclause 5.4.3, incorporated herein by reference, control information for the sidelink interface.

SUMMARY

One non-limiting and exemplary embodiment provides improved transmitting devices and corresponding methods for transmitting vehicular data and for appropriately considering quality of service requirements. The independent claims provide non-limiting and exemplary embodiments. Advantageous embodiments are subject to the dependent claims.

Several aspects are provided on how to support particular quality of service requirements for the vehicular communication via the sidelink interface, particularly when the UE is responsible for the radio resource allocation. The underlying scenario is that a transmitting device (such as a vehicular UE) shall transmit vehicular data via a sidelink interface to other devices. The vehicular UE shall support UE autonomous resource allocation as well as base station controlled resource allocation.

Correspondingly, according to a first aspect, necessary quality of service parameters are transmitted together with the vehicular data to lower layers responsible for the transmission of the vehicular data. The quality of service parameters are then used in the UE autonomous resource allocation performed by the vehicular UE so as to obtain suitable transmission parameters to be used for the transmission of the vehicular data while at the same time trying to enforce the quality of service requirements. The vehicular data is then transmitted according to the obtained transmission parameters.

According to a second aspect, different quality of service configurations (respectively with quality of service parameters) are defined, and the vehicular UE performs resource allocation and transmission of the vehicular data according to one of the quality of service configurations. In particular, the application layer generates the vehicular data as well as a QoS configuration indication and forwards both to the responsible transmission layer. In turn, the transmission layer determines the corresponding quality of service configuration and quality of service parameters and performs the UE autonomous radio resource allocation based thereon so as to obtain the necessary transmission parameters. Then, the transmission layer transmits the vehicular data via the sidelink interface.

According to a third aspect, performing the UE autonomous resource allocation or the base station controlled resource allocation is made dependent on the data that is to be transmitted. Correspondingly, the vehicular UE supports both resource allocation modes provided for the sidelink interface, however performs one of the two depending on the data that is to be transmitted. It is assumed, that quality of service is only supported by the base station controlled resource allocation. In particular, the application layer generates the vehicular data and may for instance generate a corresponding quality of service support indication, indicating whether quality of service should be supported by the lower layers or not. The quality of service indication can be forwarded together with vehicular data to the corresponding transmission layer of the vehicular UE, which then performs the resource allocation is indicated by the quality of service indication. The thus obtained transmission parameters (considering or not considering quality of service requirements) are then used for actually transmitting the 10 vehicular data.

According to a fourth aspect, the sidelink logical channel prioritization procedure is improved by additionally taken into account an aggregate maximum bit rate for the vehicular UE which indicates a maximum throughput of vehicular data transmitted by the vehicular UE via the sidelink interface. This additional parameter limits the throughput of vehicular data to be transmitted by the transmitting device via the sidelink interface.

In one general aspect, the techniques disclosed here feature a transmitting device for transmitting vehicular data via a sidelink interface to one or more receiving devices. The transmitting device performs autonomous radio resource allocation for transmitting the vehicular data via the sidelink interface. An application layer of the transmitting device generates the vehicular data and forwards the vehicular data together with a priority indication and one or more quality of service parameters to a transmission layer responsible for transmission of the vehicular data via the sidelink interface. The transmission layer performs autonomous radio resource allocation based on the received priority indication and the one or more quality of service parameters. The transmission layer transmits the vehicular data via the sidelink interface to the one or more receiving devices according to the performed autonomous radio resource allocation.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
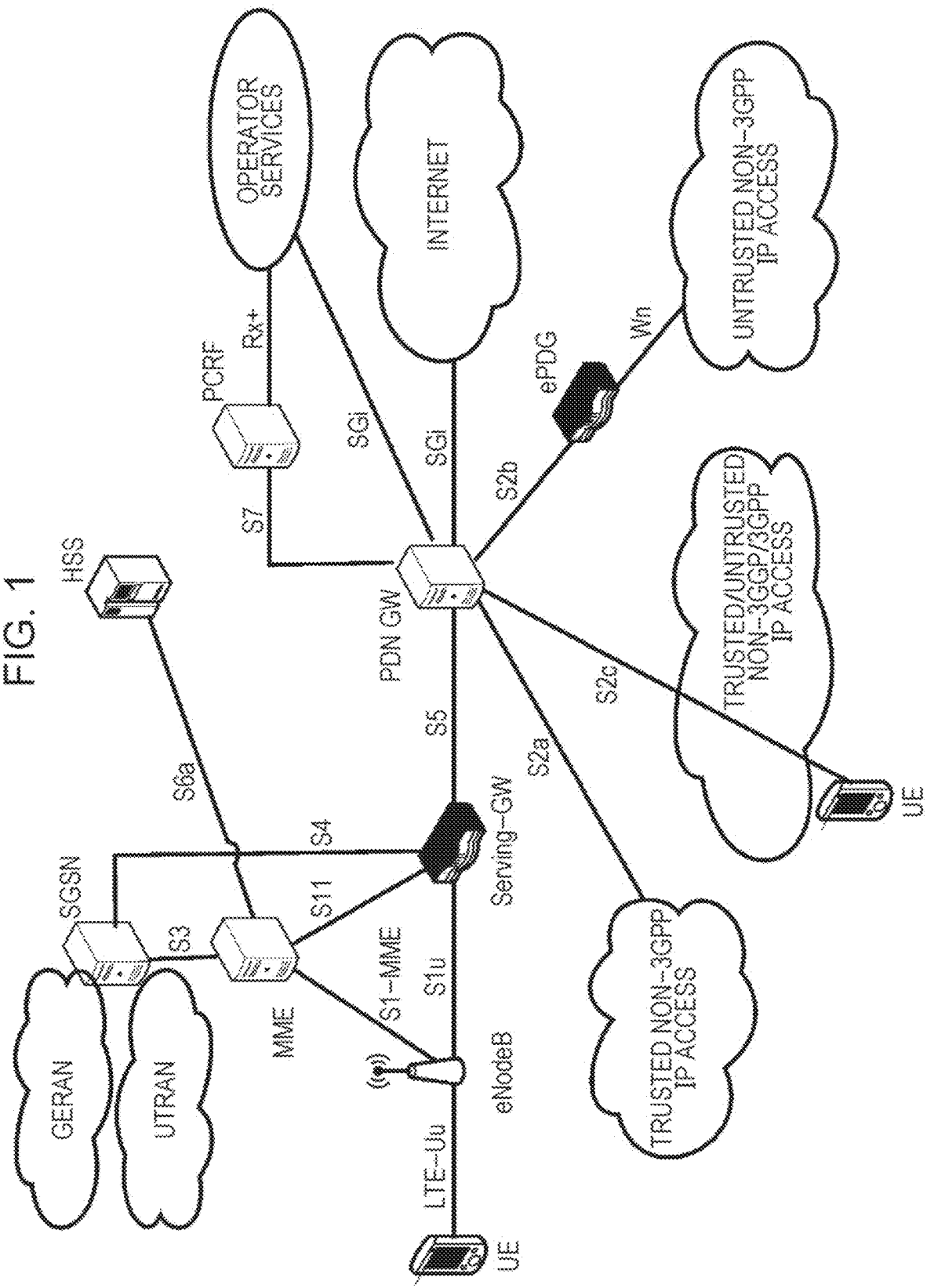
FIG. 1 shows an exemplary architecture of a 3GPP LTE system.
Figure 2:
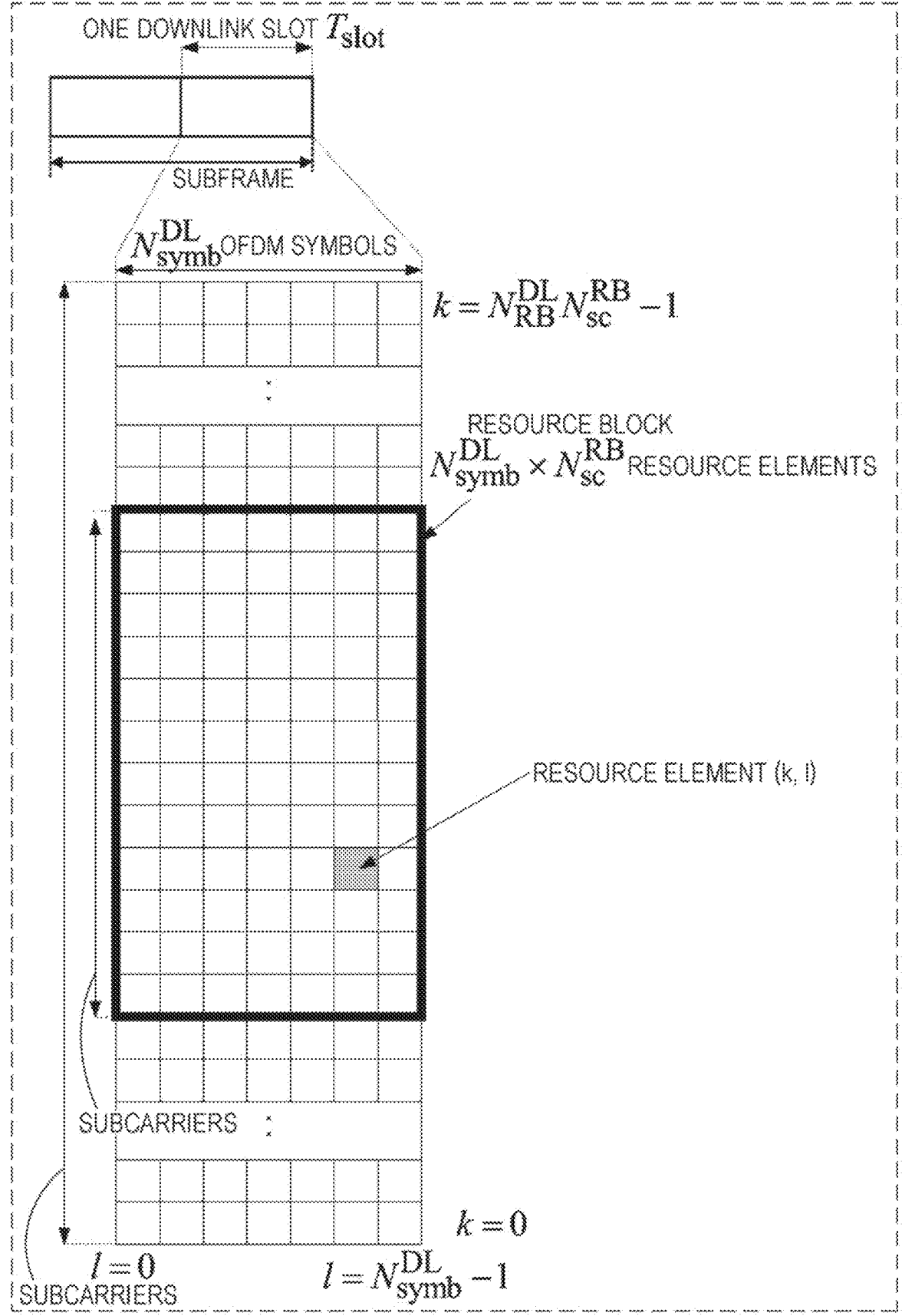
FIG. 2 shows an exemplary downlink resource grid of a downlink slot of a subframe as defined for 3GPP LTE (Release 8/9)

Basis of the Present Disclosure
Quality of Service

Multiple applications may be running in a UE at any time, each one having different requirements for its quality of service. For instance, a UE can be engaged in a VoIP (Voice over IP) call while at the same time browsing a webpage or downloading an FTP file. VoIP has more stringent requirements for the quality of service in terms of delay and delay jitter then web browsing and FTP, while the letter require a much lower packet loss rate. In order to support multiple QoS requirements, different bearers are set up within the evolved packet system, e.g. being associated with a QoS.

Generally, bearers can be classified into 2 categories based on the nature of the quality of service they provide, minimum guaranteed bit radio (GBR) bearers and non-GBR bearers. A GBR bearer can be used for applications such as a voice over IP, and has an associated GBR value for which dedicated transmission resources are permanently allocated (e.g. by an admission control function in the eNodeB). Bit rates higher than the GBR may be allowed for a GBR bearer if resources available. In such a case, a maximum bit rate (MBR) parameter sets an upper limit on the bit rate which can be expected from a GBR bearer. Non-GBR bearers do not guarantee any particular bit rate, and can be used for applications such as web browsing or FTP transfer. For these bearers, no bandwidth resources are allocated permanently to the bearer.

In the access network, it is the responsibility of the eNodeB to ensure the necessary QoS for a bearer over the radio interface. When a new bearer is established, MME signals the Bearer Setup Request (EPS Bearer Identity, EPS Bearer QoS, Session Management Request, S1-TEID) message to the eNodeB, which then maps the EPS Bearer QoS to the Radio Bearer QoS. It then signals a RRC Connection Reconfiguration (Radio Bearer QoS, Session Management Request, EPS RB Identity) message to the UE.

The EPS bearer QoS profile includes the parameters QCI (QoS Class Identifier), ARP (Allocation and Retention Priority), GBR (Guaranteed Bitrate) and MBR (Maximum Bitrate). Each EPS bearer (of type GBR and Non-GBR) is associated with the following bearer level QoS parameters:

QoS Class Identifier (QCI);
Allocation and Retention Priority (ARP).

A QCI is a scalar that is used as a reference to access node-specific parameters that control bearer level packet forwarding treatment (e.g. scheduling weights, admission thresholds, queue management thresholds, link layer protocol configuration, etc.) to be performed by an LTE node, and that have been pre-configured by the operator owning the access node (e.g. eNodeB). A one-to-one mapping of standardized QCI values to standardized characteristics is captured in TS 23.203 as illustrated in the table below which is based on Table 6.1.7 in TS 23.203 current version 14.0.0 (3GPP TS 23.203, version 14.00).

TABLE 1

| QCI | Resource Type | Priority Level | Packet Delay Budget | Packet Error Loss Rate (NOTE 2) | Example Services |
|-----|---------------|----------------|---------------------|---------------------------------|------------------|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 65 | | 0.7 | 75 ms | $10^{-2}$ | Mission Critical user plane Push To Talk voice (e.g., MCPTT) |
| 66 | | 2 | 100 ms | $10^{-2}$ | Non-Mission-Critical user plane Push To Talk voice |
| 5 | Non-GBR | 1 | 100 ms | $10^{-6}$ | IMS Signalling |
| 6 | | 6 | 300 ms | $10^{-6}$ | Video |

TABLE 1-continued

| QCI | Resource Type | Priority Level | Packet Delay Budget | Packet Error Loss Rate (NOTE 2) | Example Services |
|-----|---------------|----------------|---------------------|-----|------------------|
| 7 | | 7 | 100 ms | $10^{-3}$ | (Buffered Streaming) TCP-based (e.g., www, e-mail, chat, ftp, p2p file sharing, progressive video, etc.) Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |
| 69 | | 0.5 | 60 ms | $10^{-6}$ | Mission Critical delay sensitive signalling (e.g., MC-PTT signalling) |
| 70 | | 5.5 | 200 ms | $10^{-6}$ | Mission Critical Data (e.g. example services are the same as QCI 6/8/9) |

As apparent, each QCI contains standardized characteristics such as resource type (GBR or non-GBR), priority (1-9; lower value means higher priority), Packet Delay Budget (allowed packet delay ranging from 50 ms to 300 ms), Packet Error Loss Rate (allowed packet loss from 10-2 to 10-6). By pre-defining and standardizing the performance characteristics of each QCI value, the network operators can ensure that the same minimum level of QoS required is provided to different services/applications used in the LTE network consisting of various nodes from several vendors.

The priority and packet delay budget (and to some extent the acceptable packet loss rate) from the QCI determine the RLC mode configuration (i.e. transparent, unacknowledged, acknowledged) and how the scheduler in the MAC handles packets sent over the bearer (e.g. in terms of scheduling policy, queue management policy and rate shaping policy).

Logical Channel Prioritization, LCP, Procedure

For the uplink, the process by which a UE creates a MAC PDU to be transmitted using the allocated radio resources is fully standardized; the LCP procedure is designed to ensure that the UE satisfies the QoS of each configured radio bearer in a way which is optimal and consistent between different UE implementations. Based on the uplink transmission resource grant message signaled on the PDCCH, the UE has to decide on the amount of data for each logical channel to be included in the new MAC PDU and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest priority logical channel is served first in the MAC PDU, followed by data from the next highest priority logical channel, continuing until the MAC PDU space runs out. Although the absolute priority-based method is quite simple in terms of UE implementation, it sometimes leads to starvation of data from low-priority logical channels. Starvation means that the data from the low-priority logical channels cannot be transmitted because the data from high-priority logical channels takes up all the MAC PDU space.

In LTE, a Prioritized Bit Rate (PBR) is defined for each logical channel, in order to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

The Logical Channel Prioritization is standardized e.g. in 3GPP TS 36.321, current version v13.1.0, in subclause 5.4.3.1 incorporated herein by reference. The Logical Channel Prioritization (LCP) procedure is applied when a new transmission is performed.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE allows the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the present disclosure the terms "D2D", "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (BS). D2D users communicate directly while remaining controlled under the BS, i.e. at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e. no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g. self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 (3GPP TR 23.713, version v13.0.0) section 7.1.2 incorporated herein by reference:

Establishment of a secure layer-2 link over PC5.
IP address/prefix assignment.
Layer-2 link maintenance over PC5.
Layer-2 link release over PC5.

Figure 3:
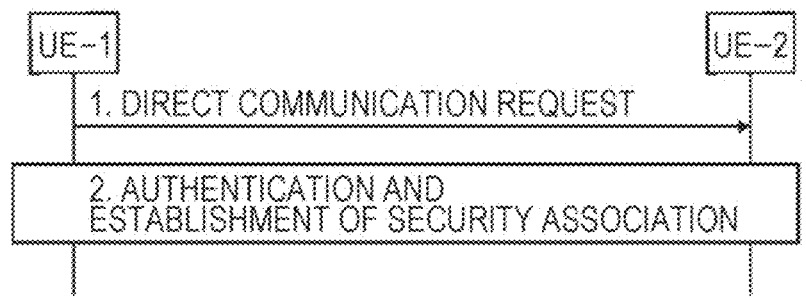
FIG. 3 schematically illustrates how to establish a layer-2 link over the PC5 for ProSe communication.

FIG. 3 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signalling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.3.0 (3GPP TS 36.300, version 13.3.0), defines in subclause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signalling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation mode, where the UE requests transmission resources from the eNB (or Release-10 relay node), and the eNodeB (or Release-10 relay node) in turn schedules the resources used by a UE to transmit direct data and direct control information (e.g. Scheduling Assignment). The UE needs to be RRC_CONNECTED in order to transmit data. In particular, the UE sends a scheduling request (D-SR or Random Access) to the eNB followed by a sidelink buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection mode, where a UE on its own selects resources (time and frequency) from resource pool(s) to transmit direct data and direct control information (i.e. SA). At least one resource pool is defined e.g. by the content of SIB18, namely by the field commTxPoolNormalCommon, these particular resource pool(s) being broadcast in the cell and then commonly available for all UEs in the cell still in RRC_Idle state. Effectively, the eNB may define up to four different instances of said pool, respectively four resource pools for the transmission of SA messages and direct data. However, in Rel-12 a UE shall always use the first resource pool defined in the list, even if it was configured with multiple resource pools. This restriction was removed for Rel-13, i.e. a UE can transmit on multiple of the configured resource pools within one SC period. How the UE selects the resource pools for transmission is further outlined below (further specified in TS36.321).

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e. RRC_IDLE or RRC_CONNECTED, and the coverage state of the UE, i.e. in-coverage, out-of-coverage. A UE is considered in-coverage if it has a serving cell (i.e. the UE is RRC_CONNECTED or is camping on a cell in RRC_IDLE).

Figure 4:
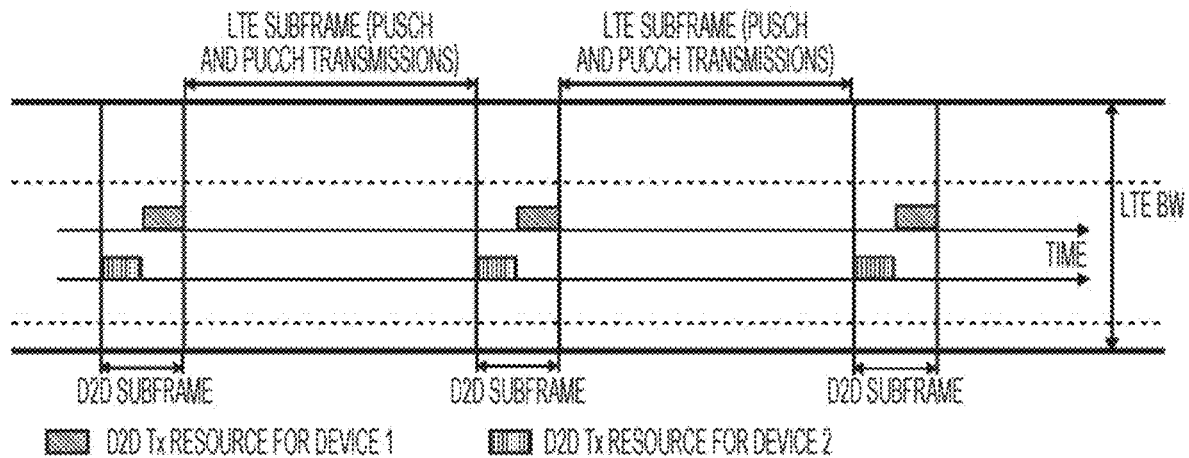
FIG. 4 illustrates the use of transmission/reception resources for overlay (LTE) and underlay (D2D) systems.

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission Procedure for D2D Communication

The D2D data transmission procedure according to Rel. 12/13 differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e. resource pool) are provided; this may be done e.g. with the exchange of the D2D communication Interest Indication by the UE and the corresponding response, D2D Communication Response, where the corresponding exemplary ProseCommConfig information element would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send sidelink BSR) via PDCCH, scrambled by C-RNTI;
Step 3: UE sends D2D/sidelink BSR indicating the buffer status via PUSCH;
Step 4: eNB grants D2D resource (for UE to send data) via PDCCH, scrambled by D2D-RNTI.
Step 5: D2D Tx UE transmits SA/D2D data according to grant received in step 4.

A Scheduling Assignment (SA), also termed SCI (Sidelink Control Information) is a compact (low-payload) message containing control information, e.g. pointer(s) to time-frequency resources, modulation and coding scheme and Group Destination ID for the corresponding D2D data transmission. An SCI transports the sidelink scheduling information for one (ProSe) destination ID. The content of the SA (SCI) is basically in accordance with the grant received in Step 4 above. The D2D grant and SA content (i.e. SCI content) are defined in the 3GPP technical standard 36.212, current version 13.1.0, subclause 5.4.3, incorporated herein by reference, defining in particular the SCI format 0 (see content of SCI format 0 above).

On the other hand, for Mode 2 resource allocation, above steps 1-4 are basically not necessary, and the UE autonomously selects radio resources for the SA and D2D data transmission from the transmission resource pool(s) configured and provided by the eNB.

Figure 5:
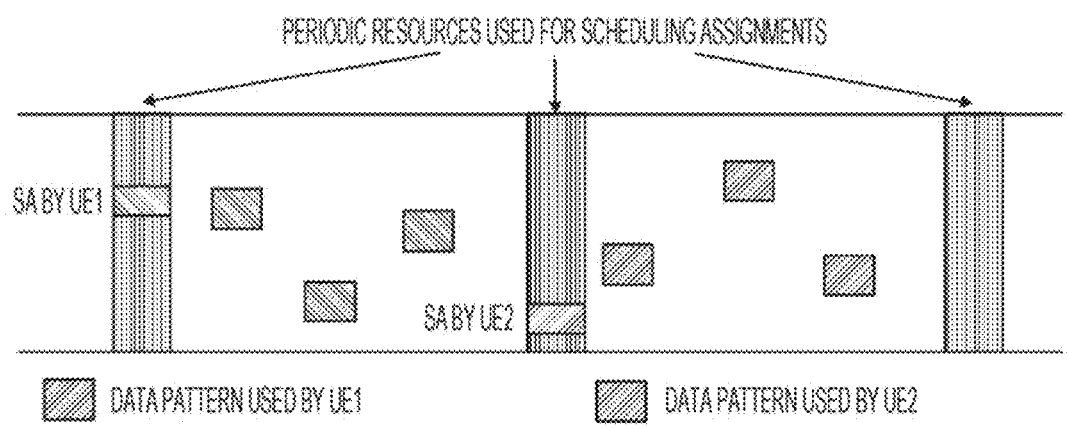
FIG. 5 illustrates the transmission of the Scheduling Assignment and the D2D data for two UEs.

FIG. 5 exemplarily illustrates the transmission of the Scheduling Assignment and the D2D data for two UEs, UE-1 and UE-2, where the resources for sending the scheduling assignments are periodic, and the resources used for the D2D data transmission are indicated by the corresponding Scheduling Assignment.

Figure 6:
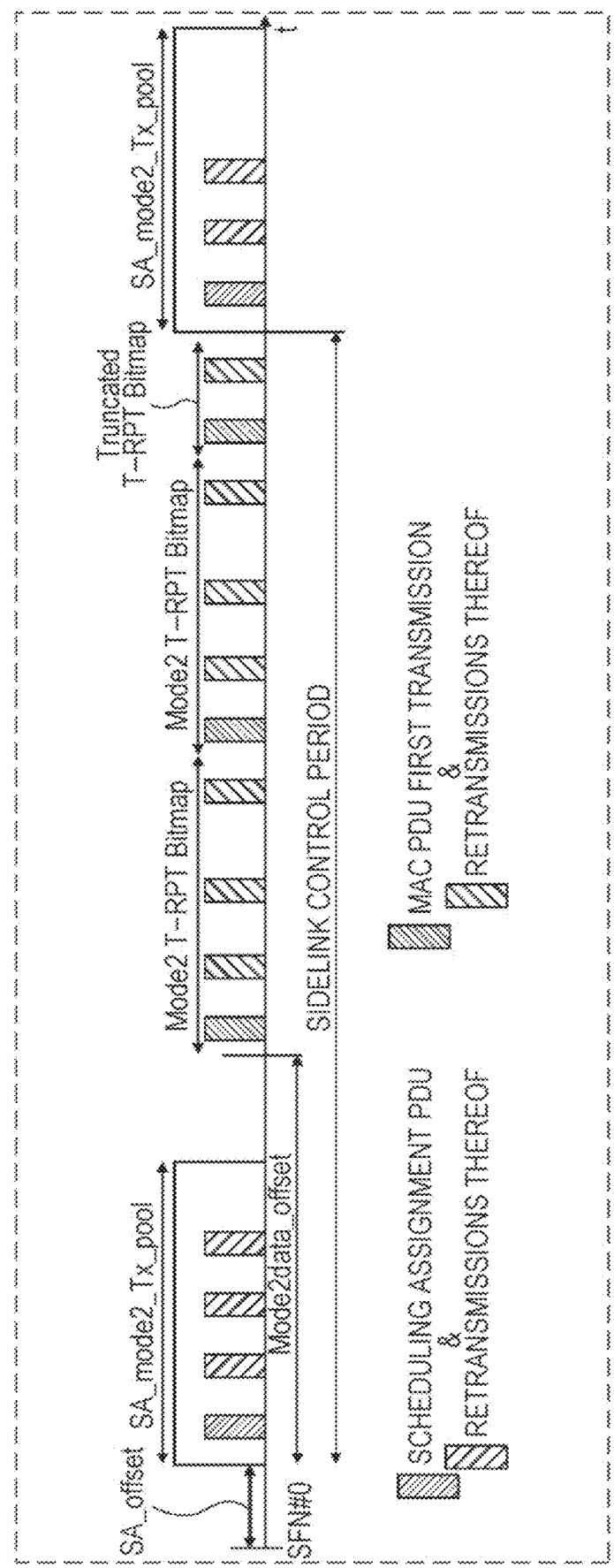
FIG. 6 illustrates the D2D communication timing for the UE-autonomous scheduling Mode 2.
Figure 7:
FIG. 7 illustrates the D2D communication timing for the eNB-scheduled scheduling Mode 1.

FIG. 6 illustrates one specific example of the D2D communication timing for Mode 2, autonomous scheduling, during one SA/data period, also known as SC period, Sidelink Control period. FIG. 7 illustrates the D2D communication timing for Mode 1, eNB-scheduled allocation during one SA/data period. In Rel. 13, 3GPP defined an SC period as being the time period consisting of transmission of a Scheduling Assignment and its corresponding data. As can be seen from FIG. 6, the UE transmits after an SA-offset time, a Scheduling Assignment using the transmission pool resources for scheduling assignments for Mode 2, SA_Mode 2_Tx_pool. The 1st transmission of the SA is followed e.g. by three retransmissions of the same SA message. Then, the UE starts the D2D data transmission, i.e. more in particular the T-RPT bitmap/pattern, at some configured offset (Mode 2data_offset) after the first subframe of the SA resource pool (given by the SA_offset). One D2D data transmission of a MAC PDU (i.e. a transport block) consists of its 1st initial transmission and several retransmissions. For the illustration of FIG. 6 (and of FIG. 7) it is assumed that three retransmissions are performed (i.e. 2nd, 3rd, and 4th transmission of the same MAC PDU). The Mode 2 T-RPT Bitmap (time resource pattern of transmission, T-RPT) basically defines the timing of the MAC PDU transmission (1st transmission) and its retransmissions (2nd, 3rd, and 4th transmission). The SA pattern basically defines the timing of the SA's initial transmission and its retransmissions (2nd, 3rd, and 4th transmission).

As currently specified in the standard, for one sidelink grant, e.g. either sent by the eNB or selected by the UE itself, the UE can transmit multiple transport blocks, MAC PDUs, (only one per subframe (TTI), i.e. one after the other), however to only one ProSe destination group. Also the retransmissions of one transport block must be finished before the first transmission of the next transport block starts, i.e. only one HARQ process is used per sidelink grant for the transmission of the multiple transport blocks. Furthermore, the UE can have and use several sidelink grants per SC period, but a different ProSe destination be selected for each of them. Thus, in one SC period the UE can transmit data to one ProSe destination only one time.

As apparent from FIG. 7, for the eNB-scheduled resource allocation mode (Mode 1), the D2D data transmission, i.e. more in particular the T-RPT pattern/bitmap, starts in the next UL subframe after the last SA transmission repetition in the SA resource pool. As explained already for FIG. 6, the Mode 1 T-RPT Bitmap (time resource pattern of transmission, T-RPT) basically defines the timing of the MAC PDU transmission (1st transmission) and its retransmissions (2nd, 3rd, and 4th transmission).

The sidelink data transmission procedure can be found in the 3GPP standard document TS 36.321 v13.1.0, section 5.14, incorporated herein by reference. Therein, the Mode-2 autonomous resource selection is described in detail, differentiating between being configured with a single radio resource pool or multiple radio resource pools.

What is discussed above is the current status of the 3GPP standard for the D2D communication. However, it should be noted that there has been ongoing discussions on how to further improve and enhance the D2D communication which will likely result in that some changes are introduced to the D2D communication in future releases. The present disclosure as will be described later shall be also applicable to those later releases.

For example, for 3GPP Rel. 14 which is currently under development, 3GPP may decide to change the transmission timing so as to no longer be based on SC periods as discussed above, but differently (e.g. based on subframes same/similar to Uu interface transmissions). Correspondingly, the above detailed examples on how transmissions over the sidelink (PC5) interface can be performed are merely exemplary and may apply to Rel. 13, but possibly not for later releases of the corresponding 3GPP standards.

ProSe Network Architecture and ProSe Entities

Figure 8:
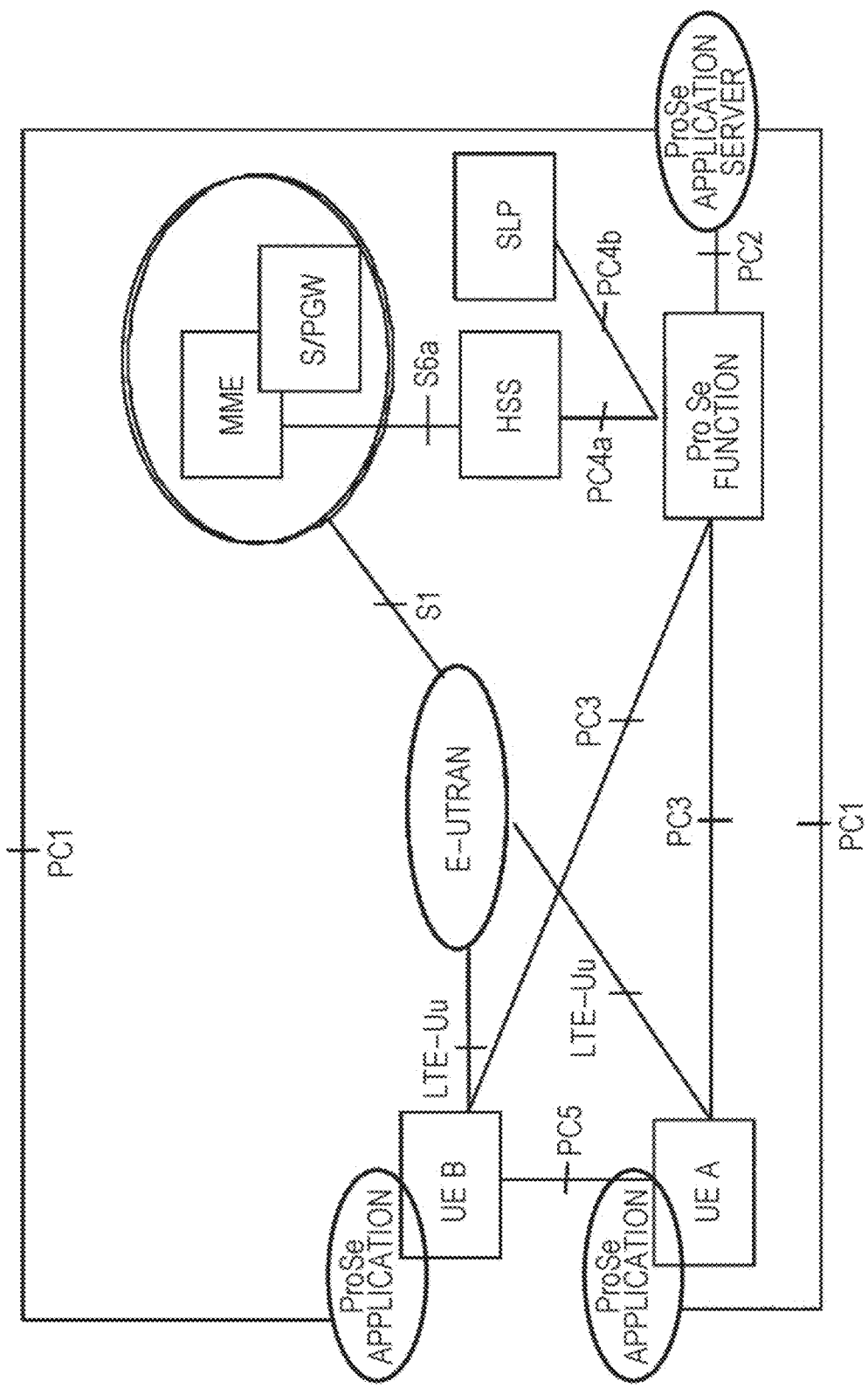
FIG. 8 illustrates an exemplary architecture model for ProSe for a non-roaming scenario.

FIG. 8 illustrates a high-level exemplary architecture for a non-roaming case, including different ProSe applications in the respective UEs A and B, as well as a ProSe Application Server and ProSe function in the network. The example architecture of FIG. 8 is taken from TS 23.303 v.13.2.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:
  Exchange of ProSe control information between ProSe-enabled UE and the ProSe Function over PC3 reference point.
  Procedures for open ProSe Direct Discovery of other ProSe-enabled UEs over PC5 reference point.
  Procedures for one-to-many ProSe Direct Communication over PC5 reference point.
  Procedures to act as a ProSe UE-to-Network Relay. The Remote UE communicates with the ProSe UE-to-Network Relay over PC5 reference point. The ProSe UE-to-Network Relay uses layer-3 packet forwarding.
  Exchange of control information between ProSe UEs over PC5 reference point, e.g. for UE-to-Network Relay detection and ProSe Direct Discovery.
  Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.
  Configuration of parameters (e.g. including IP addresses, ProSe Layer-2 Group IDs, Group security material, radio resource parameters). These parameters can be pre-configured in the UE, or, if in coverage, provisioned by signalling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

LCP Procedure for D2D, Sidelink Logical Channels

The LCP procedure for D2D according to Rel. 13 will be different than the above-presented LCP procedure for "normal" uplink LTE data transmitted on the Uu interface. The following information is taken from TS 36.321, current version 13.1.0, subclause 5.14.1.3.1 describing the LCP procedure for ProSe; it is incorporated herewith in its entirety by reference.

The Logical Channel Prioritization procedure is applied when a new transmission is performed. Each sidelink logical channel has an associated priority which can be the PPPP (ProSe per packet priority, explained later). Multiple sidelink logical channels may have the same associated priority. The mapping between priority and LCID is left for UE implementation.

The MAC entity shall perform the following Logical Channel Prioritization procedure for each SCI transmitted in an SC period:
  The MAC entity shall allocate resources to the sidelink logical channels in the following steps:
    Step 0: Select a ProSe Destination, not previously selected for this SC period, having the sidelink logical channel with the highest priority, among the sidelink logical channels having data available for transmission;
    Step 1: Among the sidelink logical channels belonging to the selected ProSe Destination and having data available for transmission, allocate resources to the sidelink logical channel with the highest priority;
    Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.
  The UE shall also follow the rules below during the scheduling procedures above: The UE shall allocate resources to the sidelink logical channels according to the following rules
  the UE should not segment an RLC SDU (or partially transmitted SDU) if the whole SDU (or partially transmitted SDU) fits into the remaining resources;
  if the UE segments an RLC SDU from the sidelink logical channel, it shall maximize the size of the segment to fill the grant as much as possible;
  the UE should maximize the transmission of data;

if the MAC entity is given a sidelink grant size that is equal to or larger than 10 bytes while having data available for transmission, the MAC entity shall not transmit only padding.

NOTE: The rules above imply that the order by which the sidelink logical channels are served is left for UE implementation.

Generally, for one MAC PDU, MAC shall consider only logical channels with the same Source Layer-2 ID—Destination Layer 2 ID pairs, i.e. for one MAC PDU, the MAC entity in the UE shall consider only logical channels of the same ProSe destination group, which basically means that the UE selects a ProSe destination during the LCP procedure. In Rel-13 it is allowed to have more than one sidelink grant within a SC period. For each sidelink grant the UE can as in Rel-12 only transmit data of one ProSe destination group. However, since the UE can be configured to have more than one valid sidelink grant within one SC period, a transmitting UE can transmit data to different ProSe destinations, i.e. each SL grant must transmit data to a different ProSe destination.

QoS Support for ProSe

In Rel-13 QoS is supported generally for ProSe one-to-many communication. For that reason the so-called ProSe Per-Packet Priority (PPPP) was introduced, e.g. in TS 23.303, version 13.4.0 (3GPP TS 23.303, version 13.4.0), section 5.4.6. ProSe Per-Packet Priority is a scalar value associated with a protocol data unit, e.g. IP packet, that defines the priority handling to be applied for transmission of that protocol data unit, i.e. priority handling for transmissions on the PC5 interface. In other words, ProSe PPP is a mechanism used to allow prioritization of packets when using ProSe Direct Communication including for ProSe UE-to-UE and also for ProSe Relay.

When the ProSe upper layer (i.e. above the PC5 access stratum) passes a protocol data unit for transmission to the PC5 access stratum, the ProSe upper layer provides a ProSe Per-Packet Priority from a range of 8 possible values.

The ProSe Per-Packet Priority is independent of the Destination Layer-2 ID and applies to both one-to-one and one-to-many ProSe Direct Communication. The ProSe Per-Packet Priority is selected by the application layer, e.g. based on various criteria that are outside the scope of this specification (such as delay requirements of the service like Voice packet transmissions or control signaling like floor control related signaling).

The ProSe Per-Packet Priority is independent of the mode in which the UE accesses the medium i.e. whether eNB-scheduled or UE-autonomous resource allocation mode for ProSe communication is used. The application layer does not know which allocation mode is being used by the lower layers of the ProSe-UE. The ProSe access stratum uses the ProSe Per-Packet Priority associated with the protocol data unit as received from the upper layers to prioritize the transmission in respect with other intra-UE transmissions (i.e. protocol data units associated with different priorities awaiting transmission inside the same UE) and inter-UE transmissions (i.e. protocol data units associated with different priorities awaiting transmission inside different UEs).

Priority queues (both intra-UE and inter-UE) are expected to be served in strict priority order i.e. UE or eNB serves all packets associated with ProSe Per-Packet Priority N before serving packets associated with priority N+1 (lower number meaning higher priority).

The priority handling on the PC5 interface itself will be specified in TS36.321, i.e. logical channel prioritization LCP procedure. For each sidelink logical channel there will be an associated priority, e.g. similar to logical channel priority in legacy LTE UL operation. The creation of sidelink logical channels will be left to UE implementation, similar to Rel-12. In addition to taking source/destination ID of packets into account when creating a logical channel, the UE will also take into account the priority of packets. Essentially protocol data units having the same PPPP value (and same source/destination ID) will be served by one sidelink logical channel with a certain associated logical channel priority, which is the same as PPPP.

As explained above, during logical channel prioritization procedure when the UE receives a SL grant, the UE selects the ProSe group having the sidelink logical channel with the highest PPPP among the sidelink logical channels having SL data, and then serves all sidelink logical channels belonging to the selected ProSe destination group in a decreasing priority order.

Vehicular Communication—V2X Services

A new study item has been set up in the 3GPP in Rel. 14 to consider the usefulness of new LTE features to the automotive industry—including Proximity Service (ProSe) and LTE-based broadcast services. ProSe functionality is thus considered as offering a good foundation for the V2X services. Cooperative services in vehicular scenarios are becoming essential for the future connected vehicle within the ITS (Intelligent Transportation Systems) research field. They are supposed to decrease road fatalities, improve the capacity of roads, diminish the carbon footprint of road transport and enhance the user experience during travels.

V2X communication is the passing of information from a vehicle to any entity that may affect the vehicle, and vice versa. This information exchange can be used to improve safety, mobility and environmental applications to include driver assistance vehicle safety, speed adaptation and warning, emergency response, travel information, navigation, traffic operations, commercial fleet planning and payment transactions.

LTE support for V2X services contains 3 types of different use cases which are the following:
  V2V: covering LTE-based communication between vehicles.
  V2P: covering LTE-based communication between a vehicle and a device carried by an individual (e.g. handheld terminal carried by a pedestrian, cyclist, driver or passenger).
  V2I: covering LTE-based communication between a vehicle and a road side unit.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

With regard to V2V communication, E-UTRAN allows such (vehicle) UEs that are in proximity of each other to exchange V2V-related information using E-UTRA(N) when permission, authorization and proximity criteria are fulfilled. The proximity criteria can be configured by the MNO (Mobile Network Operator). However, UEs supporting V2V Service can exchange such information when served by or not served by E-UTRAN which supports V2X Service.

The device (vehicle UE) supporting V2V applications transmits application layer information (e.g. about its location, dynamics, and attributes as part of the V2V Service).

The V2V payload must be flexible in order to accommodate different information contents, and the information can be transmitted periodically according to a configuration provided by the MNO.

V2V is predominantly broadcast-based; V2V includes the exchange of V2V-related application information between distinct devices directly and/or, due to the limited direct communication range of V2V, the exchange of V2V-related application information between distinct devices via infrastructure supporting V2X Service, e.g., RSU, application server, etc.

With regard to V2I communication, the device supporting V2I applications sends application layer information to the Road Side Unit, which in turn can send application layer information to a group of devices or a device supporting V2I applications.

V2N (Vehicle to Network, eNB/CN) is also introduced where one party is a UE and the other party is a serving entity, both supporting V2N applications and communicating with each other via LTE network.

With regard to V2P communication, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P Service can exchange such information even when not served by E-UTRAN which supports V2X Service.

The UE supporting V2P applications transmits application layer information. Such information can be broadcast by a vehicle with UE supporting V2X Service (e.g., warning to pedestrian), and/or by a pedestrian with UE supporting V2X Service (e.g., warning to vehicle).

V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X Service, e.g., RSU, application server, etc.

For this new study item V2X, 3GPP has provided particular terms and definition in TR 21.905, current version 13.0.0 (3GPP TR 21.905, version 13.0.0), which can be reused for this application.

Road Side Unit (RSU): An entity supporting V2I Service that can transmit to, and receive from a UE using V2I application. An RSU can be implemented in an eNB or a stationary UE.

V2I Service: A type of V2X Service, where one party is a UE and the other party is an RSU both using V2I application.

V2N Service: A type of V2X Service, where one party is a UE and the other party is a serving entity, both using V2N applications and communicating with each other via LTE network entities.

V2P Service: A type of V2X Service, where both parties of the communication are UEs using V2P application.

V2V Service: A type of V2X Service, where both parties of the communication are UEs using V2V application.

V2X Service: A type of communication service that involves a transmitting or receiving UE using V2V application via 3GPP transport. Based on the other party involved in the communication, it can be further divided into V2V Service, V2I Service, V2P Service, and V2N Service.

Many ITS services have common communication requirements:

Periodic status exchange. ITS services typically need to know about the status of vehicle or roadside terminals. This implies the periodic exchange of data packets with information about location, speed, identifier, etc.

Asynchronous notifications. This kind of messages is used to inform about a specific service event. In contrast to the previous status messages, the reliable delivery of these messages to a single terminal or a group of them is usually a key requirement.

Examples of the usage of the first communication type can be found on traffic efficiency services such as remote vehicle monitoring, which gathers periodic status data from vehicles, or safety services such as cooperative collision avoidance, which requires kinematic information about surrounding vehicles to detect potential impacts. Asynchronous notifications are mainly found in safety services, such as slippery pavement or post-collision warning.

Different types of messages are and will be defined for the V2V communication. Two different types of messages have been already defined by ETSI for the Intelligent Transport Systems (ITS), see corresponding European Standards ETSI EN 302 637-2 v1.3.1 (ETSI EN 302 637-2 v1.3.1) and ETSI EN 302 637-3 v 1.2.1 (ETSI EN 302 637-3 v1.2.1):

Cooperative Awareness Messages (CAM), which are continuously triggered by vehicle dynamics to reflect the vehicle status.

Decentralized Environmental Notification Messages (DENM), which are triggered only when vehicle-related safety events occur.

As the V2V and ITS standardizations are rather at the beginning, it is to be expected that other messages might be defined in the future. CAMs are continuously (periodically) broadcast by ITS-Stations (ITS-S) to exchange status information with other ITS-Ss, and thus have a larger impact on the traffic load than event-triggered (aperiodic) DENM messages. Essentially CAM messages are a kind of heartbeat messages periodically broadcasted by each vehicle to its neighbors to provide information of presence, position, temperature, and basic status. On the contrary, DENMs are event-triggered messages broadcasted to alert road users of a hazardous event. For this reason, traffic characteristics of CAM messages as defined by ETSI for ITS are considered more representative of V2V traffic.

In the above, the periodic Cooperative Awareness messages have been described. However, it should be noted that although some of the above information has already been standardized, other information, such as the periodicities and the message sizes, are not standardized yet and are based on assumptions. Furthermore, the standardization might change in the future and thus might also change aspects of how the CAMs are generated and transmitted. Consequently, the above detailed description of the CAMs should be understood as an example conceived for illustration purposes.

In order to the vehicular UE to have radio resources on the sidelink to transmit the CAMs, Mode 1 and/or Mode 2 radio resource allocation are envisioned as explained above. For Mode 1 radio resource allocation, the eNB allocates resources for the SA message and data for each SA period. However, when there is a lot of traffic (e.g. high-frequency periodic traffic), the overhead on the Uu link from UE to the eNB could be big.

As apparent from the above, a lot of V2V traffic is periodical, such that the 3GPP has agreed that for sidelink V2V communication Mode 1 (i.e. eNB scheduled radio resource allocation), sidelink semi-persistent radio resource allocation will be supported by eNBs and UEs.

For the UE-autonomous resource allocation mode (Mode 2) it is obvious that the collision problem, i.e. when more than one Tx UE select the same RBs to deliver messages, will impact the QoS experienced by the users. For Rel-12/13, the data (PSSCH) collision problem for the UE-autonomous resource allocation mode was not discussed since QoS for PC5/sidelink was not a major requirement. However, for V2X services, it is inevitable to improve the QoS for the UE-autonomous resource allocation mode. 3GPP generally agreed to improve the QoS of UE-autonomous resource selection by sensing and "semi-persistent" transmission (may also be termed radio resource reservation).

More in detail, it was agreed to support a sensing mechanism together with semi-persistent transmissions as autonomous resource control/selection mechanism for the V2X sidelink. The UE would indicate within the PSSCH (SA/SCI) that it has data on a selected set of periodically occurring resources until a resource selection occurs. This resource reservation information (signaled within the SCI) can be used by other UEs which are intending to transmit a V2X message for the selection of a resource such that resources that are already reserved/booked by other UEs are not considered for radio resource selection. This resource reservation/booking procedure shall be applied only to traffic for which packets arrive with a certain periodicity, e.g. CAM messages.

The indication of reserved radio resources in the scheduling information as mentioned above can be monitored ("sensed") by other (vehicular) devices. In general, sensing is used when identifying a set of candidate resources for transmission. For this purpose, the sensing process categorizes frequency resources into different groups:

- 'Unavailable' resources. These are the resources on which the UE is not allowed to transmit since those resources are already booked/reserved by other UEs.
- 'candidate resources'. These are the resources on which the UE may/can perform a transmission, and might be further categorized into 'primary resources' and 'secondary resources'

Sensing should be implementable in a simple way in order not to increase the complexity of the UE too much. It should be also noted that there might be multiple ways/options on how to implement the sensing algorithm. One potential implementation option is that every UE has a map with a prediction of frequency resources that spans over at most e.g. 1 second, starting from the next subframe. That is, at time P when a packet arrives at the buffer in the UE, the UE has a map of all frequency resources for subframes P to L, L basically denoting the maximum time span (according to QoS) until the packet should be transmitted, whether each of the resources is 'Unavailable', or candidate.

The 'Unavailable' resources are determined based on the SCI decoding (resource booking/reservation). It should be noted that the details of the selection of the actual resource for transmission (from the set of resource candidates) have not been finally decided yet in 3GPP and are still subject to discussion. One exemplary approach would be that the selection of the actual resources used for transmission is performed at random within the set of candidate resources, assigning an equal probability to all choices. Randomness might be suitable in order to ensure that UEs with similar maps of resources select different resources.

As long as the set of candidate resources is large enough, using a random selection ensures that the probability that UEs with correlated observations choose the same resource (s) is low. As a basis, the UE considers the nearest resources categorized as a candidate resources for (re)transmission of a transport block. Further restrictions may be applied to ensure that the candidate resources meet other relevant requirements such as latency, bandwidth, etc. All these resources constitute the set of candidate resources for transmission. Another approach would be to use also further energy-based sensing results in order to select the actual transmission resources among the candidate resources (in contrast to random selection). It should be noted that by having a map with information at RB level, the UE has full flexibility and does not need to know the size of the transport block to schedule when sensing.

In order to better support and guarantee the different QoS requirements for the V2X services, current discussions in 3GPP provide solutions where additional QoS parameters are used. The PC5 interface and the Uu interface are distinguished.

For instance, one solution proposed so far for the PC5 interface is that the MME provides the UE-PC5-AMBR (Aggregated Maximum Bit Rate) to the eNB as part of the UE context information. The eNB can thus use the UE-PC5-AMBR to limit the UE PC5 transmission by appropriately allocating resources. As explained, the priority information (e.g. PPPP) from the application layer is transmitted by the UE to the eNB when requesting resources (Mode 1-eNB-scheduled). The eNB shall then deduce the packet delay budget and reliability from the priority information provided by the UE, and uses same for priority handling. The mapping between priority information and packet delay budget/reliability may be based on provisioning e.g. Operation & Maintenance configuration or be defined in specification.

No appropriate solution is currently discussed for the Mode-2 UE-autonomous resource allocation, such that the QoS requirements may only be ensured for Mode 1. Equal handling of the QoS requirements for Mode 1 and Mode 2 seems however preferable; especially, considering that the V2X application is—at present—not informed about the mode employed by the lower layer(s) to transmit the V2X data.

Moreover, one solution currently investigated in 3GPP for the Uu interface is to introduce 1 GBR QCI and 1 Non-GBR QCI for the V2X services.

TABLE 2

| QCI | Resource Type | Priority Level | Packet Delay Budget | Packet Error Loss Rate | Example Services |
|---|---|---|---|---|---|
| 75 | GBR | 1.8 | 50 ms | $10^{-2}$ | V2X messages |
| 79 | Non-GBR | 5.8 | 50 ms | $10^{-2}$ | V2X messages |

As apparent, the 3GPP community is currently investigating different solutions on how to best implement QoS for the transmission of V2X data.

The present disclosure thus shall present solutions facilitating to overcome one or more of the problems mentioned above.

DETAILED DESCRIPTION OF PRESENT DISCLOSURE

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The terms "radio resources" and "frequency-time radio resources" as used in the set of claims and in the application are to be broadly understood as referring to physical radio resources, such as time-frequency resources.

The term "direct communication transmission" as used in the application is to be broadly understood as a transmission directly between two user equipments, i.e. not via the radio base station (e.g. eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection", "sidelink interface" is to be broadly understood and can be understood in the 3GPP context as the PC5 interface described in the background section.

The term "ProSe" or in its unabbreviated form, "Proximity Services", used in the application is applied in the context of Proximity-based applications and services in the LTE system as exemplarily explained in the background section. Other terminology such as "D2D" is also used in this context to refer to the Device-to-Device communication for the Proximity Services.

The term "vehicular mobile terminal" as used throughout the application may exemplarily be understood in the context of the new 3GPP study item respectively work item V2X (vehicular communication) as explained in the background section. Correspondingly, a vehicular mobile terminal shall be broadly understood as a mobile terminal which is specifically installed in a vehicle (e.g. car, commercial trucks, motorcycles etc.) to perform vehicular communication, i.e. passing information related to the vehicle to other entities (such as vehicles, infrastructure, pedestrians) e.g. for the purpose of safety or driver assistance. Optionally, the vehicular mobile terminal may have access to information available at the navigation system (provided it is also installed in the car), such as map information etc.

The terms "autonomous radio resource allocation" and "radio base station controlled radio resource allocation" as used throughout the application may exemplarily be understood in the context of 3GPP Proximity Services allowing two modes for the resource allocation; namely Mode 1 (i.e. the radio base station controlled radio resource allocation) according to which the radio base station controls the allocation, and Mode 2 (i.e. autonomous radio resource allocation) according to which the terminal (or transmitting device) autonomously selects the resources (without the radio base station).

The terms "application layer" and "transmission layer" as used throughout the application may exemplarily be understood as an abstract entity within the UE/transmitting device responsible for the respective procedure, i.e. the generation of application data (such as the vehicular data) respectively the transmission of data (e.g. also including the radio resource allocation). The "application layer" and "transmission layer may or may not correspond to a layer in the OSI (Open Systems Interconnection) layer model. The layer itself may be exemplarily implemented in software and/or hardware to perform its function. In one example, the "application layer" can be part of the Layer 3 of a UE/transmitting device or the ProSe layer. On the other hand, the "transmission layer" can be exemplarily layers 1 and 2 of a UE/transmitting device (i.e. the physical layer respectively the PDCP, RLC, MAC layers).

As explained in the background section, 3GPP has introduced a new study item for LTE-assisted vehicular communication, which shall be based on ProSe procedures to exchange V2X traffic between the various vehicular mobile terminals and other stations. Furthermore, there have been ongoing discussions and proposals for supporting quality of service requirements particularly for vehicular communication via the sidelink interface. The discussions focused so far on providing the eNB with suitable quality of service parameters. In that case however, at least one problem remains, namely how to support quality of service for vehicular communication when using for transmission of the vehicular data resource allocation Mode 2, where the UE autonomously performs the radio resource allocation, i.e. without assistance from the eNB.

The following exemplary embodiments are conceived by the inventors to mitigate the problem(s) explained above.

Particular implementations of the various embodiments are to be implemented in the wide specification as given by the 3GPP standards and explained partly in the background section, with the particular key features being added as explained in the following embodiments. It should be noted that the embodiments may be advantageously used for example in a mobile communication system, such as 3GPP LTE-A (Release 10/11/12/13/14 or later releases) communication systems as described in the Technical Background section above, but the embodiments are not limited to its use in these particular exemplary communication networks.

The scenarios and assumptions made for sake of explanation should not be understood as limiting the scope of the disclosure, but as mere examples to better understand the present disclosure. A skilled person should be aware that the general principles of the present disclosure as laid out in the claims can be applied to different scenarios and in ways that are not explicitly described herein.

The various embodiments mainly provide an improved transmission of vehicular data from a transmitting device to one or more receiving devices via a sidelink interface, which also involves the allocation of radio resources. Other functionality (i.e. functionality not changed by the various embodiments) may remain exactly the same as explained in the background section or may be changed without any consequences to the various embodiments. This may include for instance other procedures such as how the transmission of the periodic data is exactly performed by the transmitting device using the transmission parameters obtained through the resource allocation, or how the various ProSe devices discover each other.

One exemplary scenario to which the various embodiments can be applied is V2X-communication as exemplified in the background section. Consequently, the transmitting and receiving devices can be e.g. a UE in a vehicle, a road side unit, a "normal" mobile terminal carried by a pedestrian etc.

Various different embodiments are presented and explained in connection with the exemplary and illustrative V2X-scenario as will become apparent from below. A vehicular UE (in general, a transmitting device) is assumed which is installed in a vehicle and is capable of performing vehicular communication based on the D2D framework (i.e. via the sidelink PC5 interface) as explained in the background section of this application. Correspondingly, vehicular data shall be transmitted by the vehicular UE to other entities (in general, receiving devices) for which the data is of interest.

Furthermore, it is assumed that the vehicular UE supports both resource allocation modes, i.e. eNodeB controlled resource allocation Mode 1 as well as UE-autonomous resource allocation Mode 2, an exemplary implementation of which is explained in the background section. Some embodiments focus on improving the UE autonomous resource allocation Mode 2 so as to properly support and fulfill quality of service requirements. Either of the two resource allocation is performed by the vehicular UE to obtain the necessary transmission parameters to then perform the actual transmission of the vehicular data based on those transmission parameters.

For illustration purposes, the vehicular UE is considered to have a protocol stack comprising various layers, such as the layer 1 (Physical), Layer 2 (PDCP, RLC, MAC), Layer 3 (Non-Access-Stratum layers such as IP protocol, ProSe function). Different functions are performed by the respective layers. For explanatory purposes, the protocol stack is simplified to only comprise one or more application layer(s) and a transmission layer, wherein an application layer is basically responsible for generating data of an application (such as vehicular data of a vehicular application) while the transmission layer is responsible for transmitting data over the (sidelink) interface (e.g. the vehicular data or other non-vehicular data generated by respective application layers are passed to the transmission layer).

First Embodiment

In the following a first embodiment for solving the above-mentioned problem(s) will be described in detail. Different implementations and variants of the first embodiment will be explained as well.

As explained in the background section, the so-called ProSe Per-Packet-Priority (PPPP) was introduced in Release 13 to support priority handling and quality of service handling for ProSe one-to-many communication. The PPPP allows the ProSe upper layer (i.e. an application layer responsible for generating data) to prioritize data packets that are passed down (together with the PPPP) to a lower layer for transmission (i.e. a transmission layer). The transmission layer may thus use the PPPP to prioritize the received data e.g. with respect to other intra-UE data (i.e. data from other applications within the same vehicular UE).

In brief, according to the first embodiment, in addition to the PPPP, the application layer may forward parameters related to the quality of service requirements of the vehicular data to the transmission layer. A radio resource allocation procedure according to Mode 2 performed in the transmission layer takes into account the received parameters, i.e. the PPPP and the QoS parameters, to obtain the transmission parameters to be used for the transmission of the vehicular data to the receiving entities. It is thereby possible to implement QoS support for transmitting vehicular data also for the UE autonomous resource allocation mode.

In one exemplary implementation of the first embodiment, one or more of the QCI characteristics already standardized for the 3GPP LTE can be reused as the QoS parameter. In particular, 3GPP has standardized different parameters to support QoS, such as the resource type (GBR or non-GBR), the priority level, the packet delay budget, as well as the packet error loss rate (see clause 6.1.7.2 "Standardized QCI characteristics" of TS 23.203 v14.0.0 incorporated herein by reference). The priority level standardized in clause 6.1.7.2 could be seen to correspond to the PPPP (mentioned above as introduced for ProSe communication), and as such could be seen as a parameter separate from the other QoS parameters. Alternatively, the PPPP could be seen as another QoS parameter.

In brief, the resource type basically indicates whether a particular bit rate is to be guaranteed or not when transmitting the data. The packet delay budget defines an upper bound for the time that a packet may take for the delivery from the transmitting entity (vehicular UE) to the receiving entity. The packet error loss rate (PELR) defines an upper bound for the rate of packets that are not successfully delivered to the receiving entity. The Packet Error Loss Rate may be set so as to support a high reliability without requiring application-layer message retransmissions while considering the low Packet Delay Budget which may cause the higher PELR.

According to the first embodiment, the application layer responsible for the vehicular communication generates V2X data. As mentioned before, the application layer sets the PPPP of the V2X message when passing it to lower layer(s) for transmission. The mapping of application layer V2X message priority to PPPP is e.g. based on a pre-configuration in the UE. The configuration of such mapping on the UE is out of scope of 3GPP and independent of the embodiments discussed herein. As the application layer is generally aware of the type of V2X data that is to be transmitted, the application layer may also provide—similar to the corresponding PPPP—one or more of the above-mentioned QoS parameters corresponding to the generated V2X data to the lower layer(s). Again, the mapping between the application layer V2X data and the QoS parameters is e.g. based on a pre-configuration in the UE. The V2X data, the PPPP, and the one or more QoS parameters are passed down the protocol stack to the transmission layer(s) responsible for performing the radio resource allocation and the transmission of the V2X data.

According to one example, the QoS parameter(s) (as well as the PPPP) are forwarded together with every packet to the transmission layer. It is thereby possible to appropriately support QoS for any data packet transmission, by selectively distinguishing the QoS requirements for identical PPPP. Alternatively, while the PPPP is forwarded with every packet, the QoS parameters may only be provided to the transmission layer at the beginning (e.g. once), i.e. when a new service is started and the corresponding sidelink logical channels in the lower layers are set up. Then, the transmission layer of the vehicular UE can associate subsequent data packets forwarded together with the same PPPP to the previously-received QoS parameter(s) based on the received PPPP; one sidelink logical channel configured for a particular PPPP is associated with the QoS parameters received when that sidelink logical channel was set up. This has the advantage that the inter-layer communication is reduced, since the QoS parameters do not need to be transmitted with every data packet.

As mentioned above, the vehicular UE performs resource allocation according to Mode 2 (i.e. UE-autonomous) to obtain the necessary transmission parameters and shall thereby further taking into account the PPPP and QoS parameter(s), e.g. in a corresponding manner as done by the eNB for the Mode 1 resource allocation. In more detail, performing the Mode 2 resource allocation typically involves selecting a suitable modulation scheme and coding rate as well as the selection of sufficient frequency-time radio resources to transmit the coded data. In addition, D2D data transmissions will likely involve blind repetitions (e.g.

without HARQ feedback) of a transport block in order to increase transmission reliability. Assuming that the number of the overall transmissions is flexible and not preconfigured, the radio resource allocation may also involve determining the number of transmissions of the data packet that should be performed by the vehicular UE in total.

The resource allocation shall be performed based on the parameters received from the upper layer for the V2X data to be transmitted. For instance, the modulation scheme and/or coding rate can be selected such that the packet error loss rate will likely be fulfilled. Similarly, by increasing the number of total transmissions for one transport block, the vehicular UE can decrease the packet error loss rate. Thus, the number of transmissions may be selected on the basis of the packet error loss rate.

On the other hand, the packet delay budget could be used during the radio resource allocation e.g. when the vehicular UE determines available frequency time radio resources based on the previously obtained sensing results. As it was agreed to support sensing with semi-persistent transmission for the autonomous resource control/selection mechanism for the PC5 transmission of vehicular data, the transmitting device selects unused/free radio resources for the transmission (including retransmissions) of the data packet, based on the sensing results performed over the sensing window, wherein the transmission resources shall lie within the delay packet budget. For example in case the packet delay budget is 20 ms, the vehicular UE shall ensure that all the transmissions of the data packet take place within 20 ms upon the packet has arrived in the UE's buffer. Moreover, the packet delay budget can be used in the vehicular UE to determine expired data packets (i.e. a data packet for which the packet delay budget is exceeded), which in that case can be discarded.

The priority level (or PPPP) received from the application layer can be used e.g. in the sidelink logical channel prioritization procedure, when allocating the determined frequency-time radio resources to generate a transport block carrying the V2X data. In one exemplary implementation, the frequency-time radio resources are allocated to transmitting data in a decreasing order of the PPPP of the V2X data (more specifically, of the logical channels set up according to the PPPP of the V2X data). The thus created transport block is then transmitted by the vehicular UE to the other receiving device(s).

Figure 9:
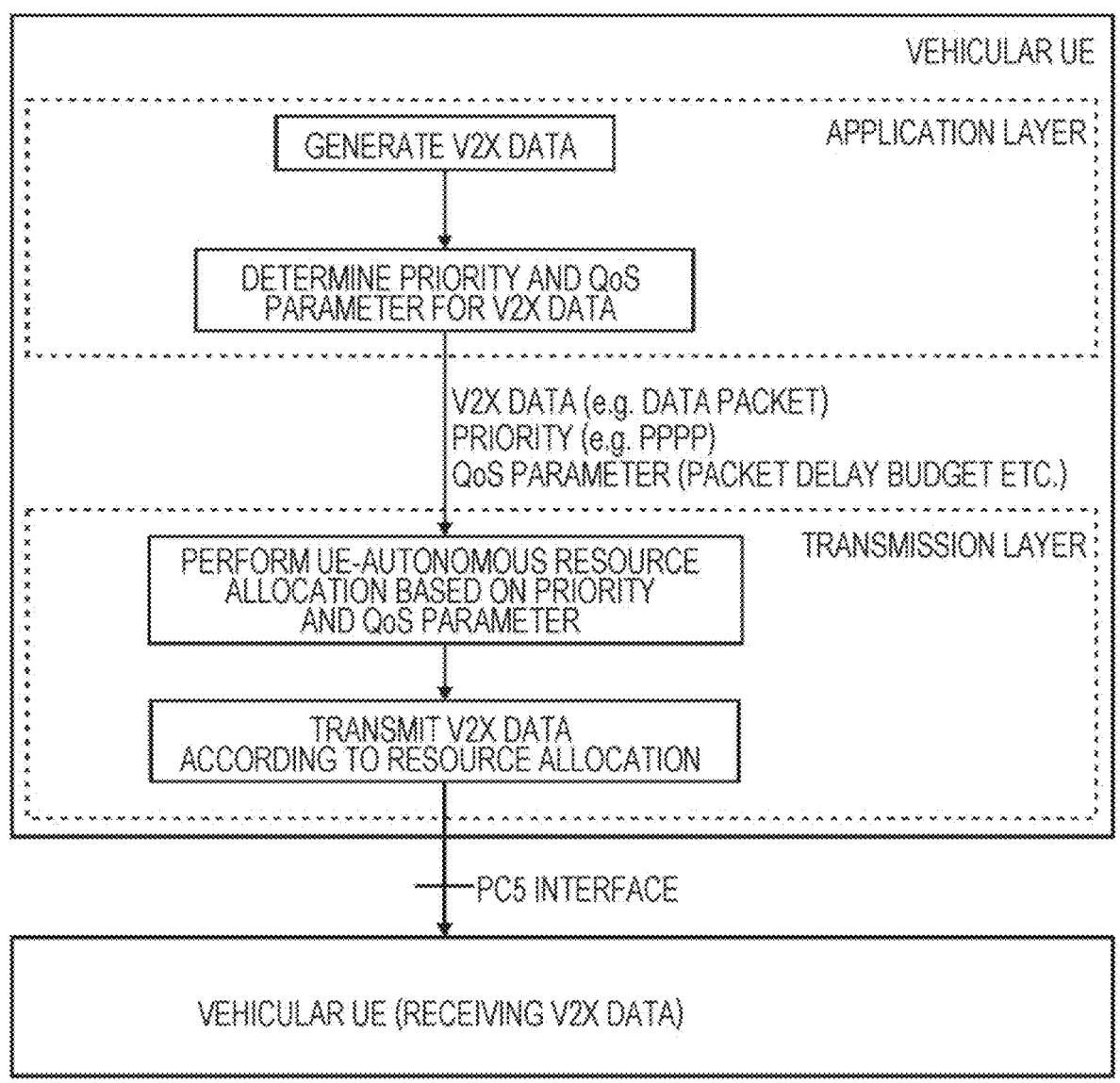
FIG. 9 is a diagram for the first embodiment, illustrating the operation of the vehicular transmitting UE.

FIG. 9 is a diagram illustrating an exemplary implementation of the first embodiment, showing the functions performed by the application and transmission layer. As apparent therefrom, the application layer generates the V2X data, subsequently determines corresponding priority and QoS parameters for the V2X data, and provides the same to the lower transmission layer responsible for the transmission. The transmission layer in turn performs the UE autonomous resource allocation based on the received parameters and priority and proceeds to transmit the V2X data via the PC5 interface to other devices.

Moreover, according to further implementations of the first embodiment, the vehicular UE may be provided with information on the UE-PC5-AMBR (Aggregate Maximum Bit Rate for the sidelink interface). The UE-PC5-AMBR can be understood as the maximum total data throughput that is allowed for the UE for transmissions over the sidelink interface. Put differently, the UE is limited to a particular, averaged, bit rate (data per unit time) when transmitting data via the sidelink interface. According to this general definition, the AMBR is UE-specific as well as interface-specific, but applies to all sidelink logical channels, i.e. sidelink logical channels carrying vehicular or non-vehicular data.

In one variant, the UE-PC5-AMBR can be provided to the vehicular UE in a corresponding dedicated message from the eNB, e.g. during the attach procedure. During the attach procedure, the MME obtains the UE-PC5-AMBR according to UE subscription from the HSS (Home Subscriber Server) and the network operator's policy. This UE-PC5-AMBR is then sent from the MME to the eNB during the initial context setup procedure for the UE. The eNB can then further inform the UE of the UE-PC5-AMBR value. Alternatively, the UE can be provided with the UE-PC5-AMBR value from a higher layer (application) based on some pre-configuration.

The UE-PC5-AMBR can be used as a parameter in the sidelink logical channel prioritization procedure so as to limit the amount of data that is to be transmitted via the sidelink interface. In one exemplary implementation, a token bucket algorithm can be used in the sidelink LCP procedure to implement this limitation (e.g. similar to the normal legacy LCP procedure as explained in the background section). Particularly, a token bucket can be defined for sidelink logical channels, such that radio resources can only be allocated to the sidelink logical channels as long as the bucket is not empty (i.e. >0). However, also other implementations not using a token bucket algorithm may be foreseen to apply the limitation given by the UE-PC5-V2X-AMBR parameter.

A specific exemplary implementation of such an adapted sidelink LCP procedure is given in the following. As done in the current sidelink logical channel prioritization procedure, the UE will allocate resource to the sidelink logical channels in strict priority order. The selection of the destination (ProSe destination) is not considered here for simplicity reasons. The corresponding lower layer (i.e. MAC) shall allocate resources to the (relevant) sidelink logical channels in the following steps:

1. All the sidelink logical channels having data available for transmission are served in decreasing order of priority until either the data for the sidelink logical channel(s) or the SL grant is exhausted or the bucket is empty, whichever comes first.

2. The MAC entity shall decrement the bucket level by the total size of MAC SDUs served in the above step.

According to a further exemplary implementation, the lower layers—transmission layer—indicates to the application layer the resource allocation mode the vehicular UE is configured with/is using. This information is used in the application in order to decide whether the transmission layer needs to the provided with QoS parameters for the data packets. More in particular only for the case that the vehicular UE is operating in the UE autonomous resource allocation mode (Mode 2) the application layer needs to provide the QoS information/parameter to the lower layers.

Second Embodiment

In the following a second embodiment is presented which deals with the same problem as the one solved by the first embodiment, i.e. the one explained at the beginning of the detailed description namely how to implement the quality of service support for vehicular communication via the sidelink interface, specifically where the vehicular UE is performing the UE-autonomous radio resource allocation.

In brief, according to the second embodiment, at least one quality of service configuration is defined, which indicates one or more quality of service parameters. The transmitting device being in possession of the QoS configuration(s) then selects a suitable QoS configuration according to the vehicular data that is to be transmitted via the sidelink interface. In a similar manner as in the first embodiment, the radio resource allocation performed by the vehicular UE according to Mode 2 takes the QoS parameters of the one QoS configuration into account when obtaining the transmission parameters. The vehicular data is transmitted according to the performed radio resource allocation and the correspondingly obtained transmission parameters. Consequently, it is possible to support different QoS requirements for transmitting the V2X data via the PC5 interface also when performing Mode 2 resource allocation.

As already explained in connection with the first embodiment, one or more of the standardized 3GPP LTE QoS parameters can be reused for implementing quality of service, i.e. a packet delay budget, a packet error loss rate, a resource type. Reference is made to the more detailed explanations with regard to these QoS parameters made in connection with the first embodiment.

Various different QoS configurations (may also be termed QoS classes) can be defined to distinguish the quality of service requirements suitable for vehicular data. As explained in the background section, there have already been made proposals on how to define QoS requirements for V2X data transmissions on the Uu interface. In particular, the following two different QoS configurations (respectively identified by the QCI 75 and 79) have been proposed:

TABLE 3

| QCI | Resource Type | Priority Level | Packet Delay Budget | Packet Error Loss Rate | Example Services |
|---|---|---|---|---|---|
| 75 | GBR | 1.8 | 50 ms | $10^{-2}$ | V2X messages |
| 79 | Non-GBR | 5.8 | 50 ms | $10^{-2}$ | V2X messages |

These QoS configurations of the table can be taken as guidance on how to apply QoS to the V2X data transmissions on the PC5 sidelink interface according to the second embodiment. In particular, one possible QoS configuration would then define the resource type to be GBR, the packet delay budget to be 50 ms, and the packet error loss rate to be 10-2, while the other QoS configuration would then define the resource type to be non-GBR, the packet delay budget to be 50 ms, and packet error loss rate to be 10-2. It should be noted that the above are merely examples and different constellations and values for the parameters can be chosen as appropriate.

As apparent from the above table, different priority levels are foreseen for the QoS requirements over the Uu interface. As regards QoS support for the sidelink interface, the priority level parameter of the listed QoS configurations may not be needed in view of that the ProSe per-packet-priority (PPPP) is already standardized for indicating the priority of D2D (vehicular) data. In other words, the PPPP may be used separately from the QoS configuration.

On the other hand, it may also be of interest to standardize the priority level for the different QoS configurations so as to thereby have a consistent QoS definition for the vehicular data independent of the particular application layer generating the vehicular data. In this case, a PPPP would not be used (and thus not forwarded as such to the lower layer), or the PPPP (if generated by the application) could be overwritten by the priority level given by selected QoS configuration (still alternatively the PPPP, if forwarded, could overwrite the priority level).

Optionally, a further possible QoS parameter for vehicular data transmissions via the sidelink interface would be the repetition number i.e. the number of total transmissions for a transport block as explained in more detail in the first embodiment.

In any case, different QoS configurations can thus be defined, respectively distinguishing between one or more of the QoS parameters (such as packet delay budget, packet ever loss rate, and resource type). In effect, different vehicular data can thus be treated differently as regards their QoS requirements.

There are several possibilities on how the QoS configuration(s) can be provided to the vehicular UE(s). According to one exemplary implementation of the second embodiment, the eNB broadcasts information on the different QoS configurations in its radio cell, such that all (vehicular) UEs receive the information. For instance, a V2X-specific system information block could be broadcast by the eNB, including the QoS configuration(s) (and possibly other V2X-related information as well). Alternatively, the vehicular UE could be provided by dedicated signaling with the QoS configuration(s), e.g. when configuring the resource allocation mode or the vehicular UE could be pre-configured with QoS configuration(s).

In any case, it is assumed that the vehicular UE is thus provided with the different QoS configurations and thus can selectively use an appropriate QoS configuration to fulfill certain QoS requirements for the transmission of vehicular data via the sidelink interface. The QoS configuration shall be selected so as to be suitable for the vehicular data that is to be transmitted. A mapping between the application layer V2X data and the suitable QoS configuration is e.g. based on a pre-configuration in the UE. Alternatively, the V2X-to-QoS class mapping can be provided to the vehicular UEs by using a system information block (e.g. the above-mentioned V2X-specific system information block) broadcast by the eNodeB or dedicated signaling as outlined above.

The application layer which generates the vehicular data can properly determine which QoS configuration is most suitable for the generated V2X data and can provide a corresponding indication together with the generated data to the lower layer(s) (transmission layer) responsible for the transmission of the V2X data via the sidelink interface. In turn, the transmission layer can determine the QoS configuration and thus the corresponding QoS parameters, which are then used during the radio resource allocation procedure to obtain the necessary parameters for the transmission of the V2X data. The above mentioned indication generated by the application layer to identify the QoS configuration selected for the generated V2X data, can be e.g. similar to the QCI, i.e. the QoS Class Indicator already known from the 3GPP standards. As presented in the above table, QCI values 75 and 79 were exemplarily suggested during 3GPP discussion to identify the two QoS classes defined for the vehicular messages transmitted via the Uu interface. In a similar manner, QCI values can be used to distinguish between different QoS configurations to be used by the vehicular UE. The transmission layer upon being informed about a QoS configuration indicator value, can determine the corresponding QoS configuration intended to be fulfilled for the transmission of the V2X data. According to one exemplary implementation of the first embodiment, the application layer forwards the QoS configuration indicator together with a data packet to the lower layers. Based on this information, the lower layer—transmission layer—knows which QoS configuration to apply for the transmission of this data packet. Optionally, the application layer may also forward the PPPP for the V2X data to the transmission layer; specifically for the case where the QoS configuration does not specify a priority level. On the other hand, in case the QoS configuration(s) also specifies a particular priority level of the V2X data, no separate PPPP indication would theoretically be necessary (or the PPPP would be overwritten by the priority level given by the QoS configuration, or vice versa).

Figure 10:
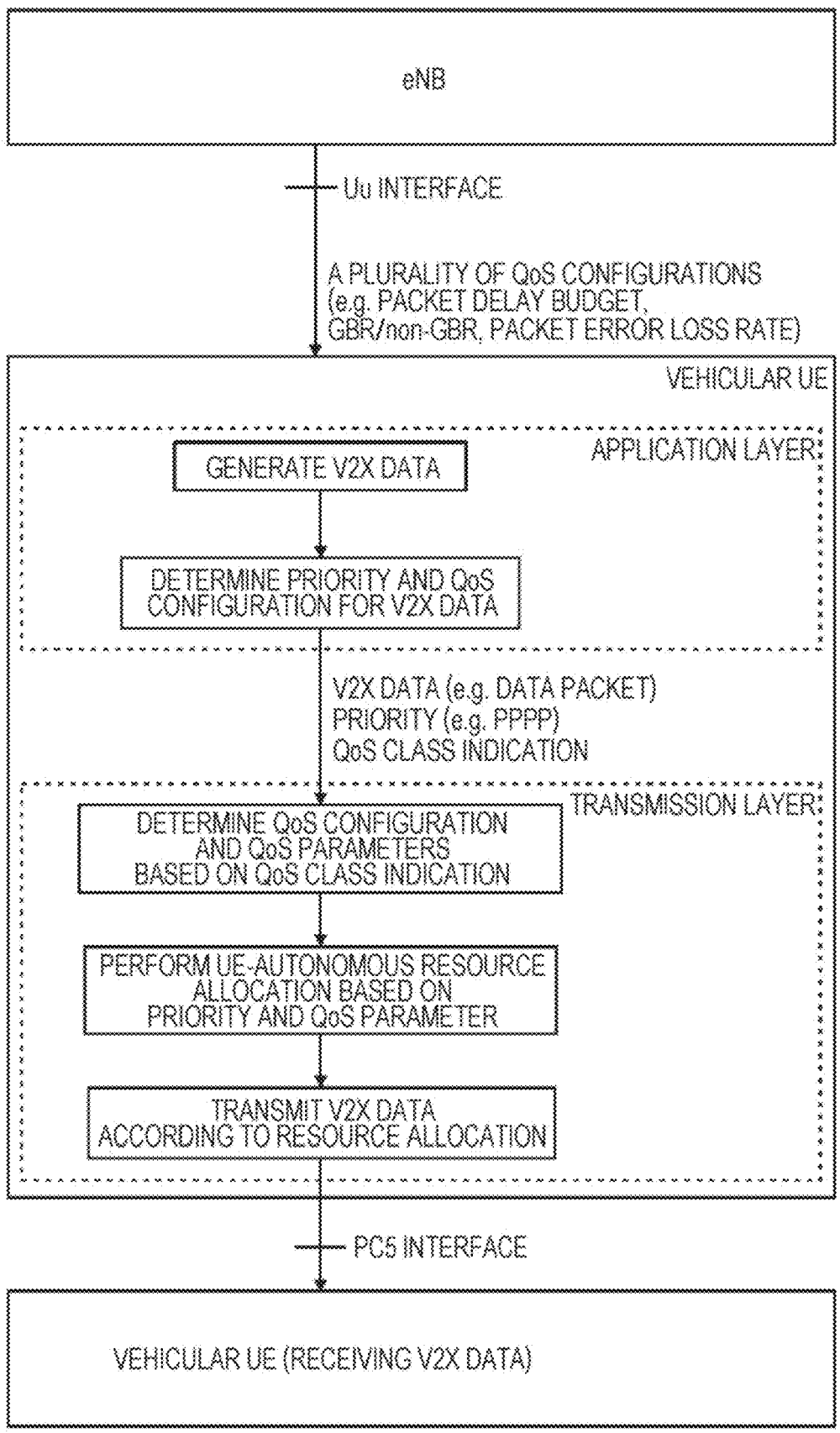
FIG. 10 is a diagram for the second embodiment, illustrating the operation of the vehicular transmitting UE.

FIG. 10 is a diagram illustrating an exemplary implementation of the second embodiment where the QCI is used as the indicator between the application and transmission layer to identify the corresponding QoS configuration. As apparent therefrom, upon generating the V2X data, the application layer determines the corresponding priority (e.g. PPPP) for the V2X data as well as the QoS configuration which shall be enforced in the lower layer(s) for said V2X data. A corresponding QoS class indication (i.e. the QCI) is provided together with the V2X data as well as optionally together with the priority to the transmission layer. In turn, the transmission layer determines the QoS configuration and thus the corresponding QoS parameters based on the received QCI. The UE autonomous resource allocation can be performed by the transmission layer based on the received priority and QoS parameters of the determined QoS configuration so as to then perform the actual transmission of the V2X data in accordance therewith.

Alternatively (not shown in FIG. 10), instead of using the QoS configuration indicator as an indicator for identifying the QoS configuration of a data packet (or respectively sidelink logical channel), the PPPP can be used in said respect. As explained before, the PPPP indicates the priority of the vehicular data generated in the application layer; the mapping of application layer V2X message priority to PPPP is e.g. based on a pre-configuration in the UE. Then, the transmission layer receives from the application layer the vehicular data as well as the PPPP, and on that basis determines which QoS configuration is to be applied to the transmission of said V2X data. A suitable mapping between different PPPP values and the QoS configurations can e.g. be based on a pre-configuration in the UE. Another option is that the PPPP-to-QoS configuration mapping is received in a corresponding system information block broadcast by the eNodeB or received via dedicated signaling from the eNB. Alternatively, the PPPP-to-QoS class mapping can be provided to the transmission layer from the application layer.

In one example, the indication (be it the QoS configuration indicator or PPPP) can be forwarded from the application layer to the transmission layer with every packet.

The above explanation is such that the QoS is determined based on the vehicular data that is to be transmitted. However, the implementations of the second embodiment can also be seen in that the QoS configurations are to be applied to the respective sidelink logical channels. In particular, vehicular data is handled through different sidelink logical channels, e.g. distinguished by their priority such that vehicular data having the same priority (and having the same source and destination ID) is handled by the same sidelink logical channel. QoS can be seen as a concept which is usually applied on a bearer/logical channel specific level. Consequently, it may be also be said that the transmission layer identifies for a sidelink logical channel which QoS (configuration) is to be applied.

In case data of different sidelink logical channels are multiplexed in one TB, e.g. during the sidelink logical channel procedure, the QoS parameters used for the radio resource selection and the subsequent transmission of the transport block over the PC5 interface, e.g packet delay budget or reliability, should be chosen based on the logical channel having the highest priority. Alternatively, the QoS parameters used for radio resource selection and the subsequent transmission of the transport block should be based on the QoS parameters having the strictest requirements, i.e. using the smallest packet delay budget of the involved logical channels.

In any case, the transmission layer obtains the relevant QoS parameters that should be fulfilled for the transmission of the V2X data. The transmission layer (e.g. the MAC and physical layer specifically) can thus perform the Mode 2 radio resource allocation and the actual transmission of the V2X data also considering the QoS parameters. Details on how the different QoS parameters can be considered are already provided in connection with the first embodiment. In brief, the modulation scheme and/or the coding rate can be selected such that the packet error loss rate is fulfilled. Packet error loss rate is an important parameter to determine the number of total transmissions for one transport block. The packet delay budget can be used during the radio resource allocation to determine the available resources based on the previously obtained sensing results, thereby taking into account that the transmission of the data packet shall take place within the packet delay budget. Furthermore, discard of expired data packets can also depend on the packet delay budget. The priority level of a QoS configuration, or alternatively the PPPP, is e.g. used within the sidelink logical channel prioritization procedure, so as to prioritize sidelink logical channels when allocating the radio resources.

According to further implementations of the second embodiment, the vehicular UE may be provided with information on the UE-PC5-AMBR (Aggregate Maximum Bit Rate for the sidelink interface). As already explained in connection with the first embodiment, the UE-PC5-AMBR can be understood as the maximum total data throughout that is allowed for the UE for transmissions over the sidelink interface. There are several possibilities on how the vehicular UE can be provided with the UE-PC5-AMBR, e.g. within a system information broadcast carrying the QoS configurations. Alternatively, the UE-PC5-AMBR can be provided to the vehicular UE in a corresponding dedicated message from the eNB, e.g. during the attach procedure; for details reference is made to the corresponding passages made for the first embodiment. The UE-PC5-AMBR can be used as a parameter in the sidelink logical channel prioritization procedure so as to limit the amount of data that is to be transmitted via the sidelink interface. As already explained for the first embodiment, the parameter may be used as a parameter in a token bucket algorithm. One specific exemplary implementation of such a token bucket algorithm for the sidelink LCP procedure is presented in connection with the first embodiment and can be used as well in the context of the second embodiment.

Consequently, while in resource allocation Mode 1 QoS handling is left to the eNB which is responsible in said respect, the second embodiment provides a solution where it is possible to support QoS handling also for the UE-autonomous resource allocation Mode 2 performed by the vehicular UE when transmitting vehicular data via the PC5 interface.

Third Embodiment

In the following a third embodiment is presented which deals with the same problem as the one solved by the first and second embodiments, i.e. the one explained at the beginning of the detailed description namely how to implement the quality of service support for vehicular communication via the sidelink interface, specifically where the vehicular UE is performing the autonomous radio resource allocation mode. For the third embodiment it is exemplarily assumed that the QoS support is mainly provided by the Mode 1 resource allocation, while the UE autonomous resource allocation according to Mode 2 does not necessarily support the fulfillment of QoS requirements. In particular, one exemplary assumption is that QoS support is mainly applied in the Mode 1 resource allocation where the eNodeB determines the QoS parameters for the vehicular data e.g. from the PPPP transmitted by the vehicular UE together with the scheduling request and/or the buffer status report when requesting radio resources. A corresponding mapping between the received PPPP and QoS parameters (e.g. of a corresponding QoS configuration) can be e.g. preconfigured in the eNodeB. According to this exemplary assumption, the vehicular UE is however not provided with the necessary information on the QoS parameters such that the vehicular UE cannot take QoS requirements of data into account when performing the UE autonomous resource allocation (Mode 2).

According to the third embodiment, a vehicular UE supports both resource allocation modes and is further configured to perform radio resource allocation depending on the vehicular data that is to be transmitted. In more detail, as explained in the background section, in the prior art the vehicular UE determines which radio resource allocation to apply according to configuration from the eNodeB (e.g. on the basis of the presence of a corresponding UE autonomous Mode 2 resource pool). Alternatively, what resource allocation mode a UE is going to use may also depend on the RRC state (i.e. whether the vehicular UE is RRC connected or not) or depending on the coverage state of the UE (i.e. in coverage, out of coverage). On the other hand, the third embodiment provides a solution by distinguishing different data and selectively applying Mode 1 resource allocation or Mode 2 resource allocation.

In brief, the vehicular UE (e.g. the application layer) generates the vehicular data that is to be transmitted, and passes the same down to the transmission layer responsible for the actual transmission. Depending on the vehicular data (e.g. whether or not QoS should be supported for that data), a suitable radio resource allocation mode is selected, and then the selected resource allocation procedure is performed to obtain suitable transmission parameters. For instance, if QoS should be supported for the particular vehicular data, the vehicular UE would select Mode 1 resource allocation and would correspondingly request radio resources from the eNodeB which would determine the transmission parameters taking QoS requirements of the particular vehicular data into account. On the other hand, if QoS should not be supported for the particular vehicular data, the vehicular UE would select Mode 2 resource allocation and would autonomously determine the transmission parameters itself. In either case, with the obtained transmission parameters the transmission layer then performs the transmission of the data. Consequently it is possible to selectively apply QoS support to particular vehicular data transmissions by performing either the Mode 1 radio resource allocation (to be able to fulfill particular QoS requirements) or Mode 2 radio resource allocation (if no particular QoS should be supported).

Figure 11:
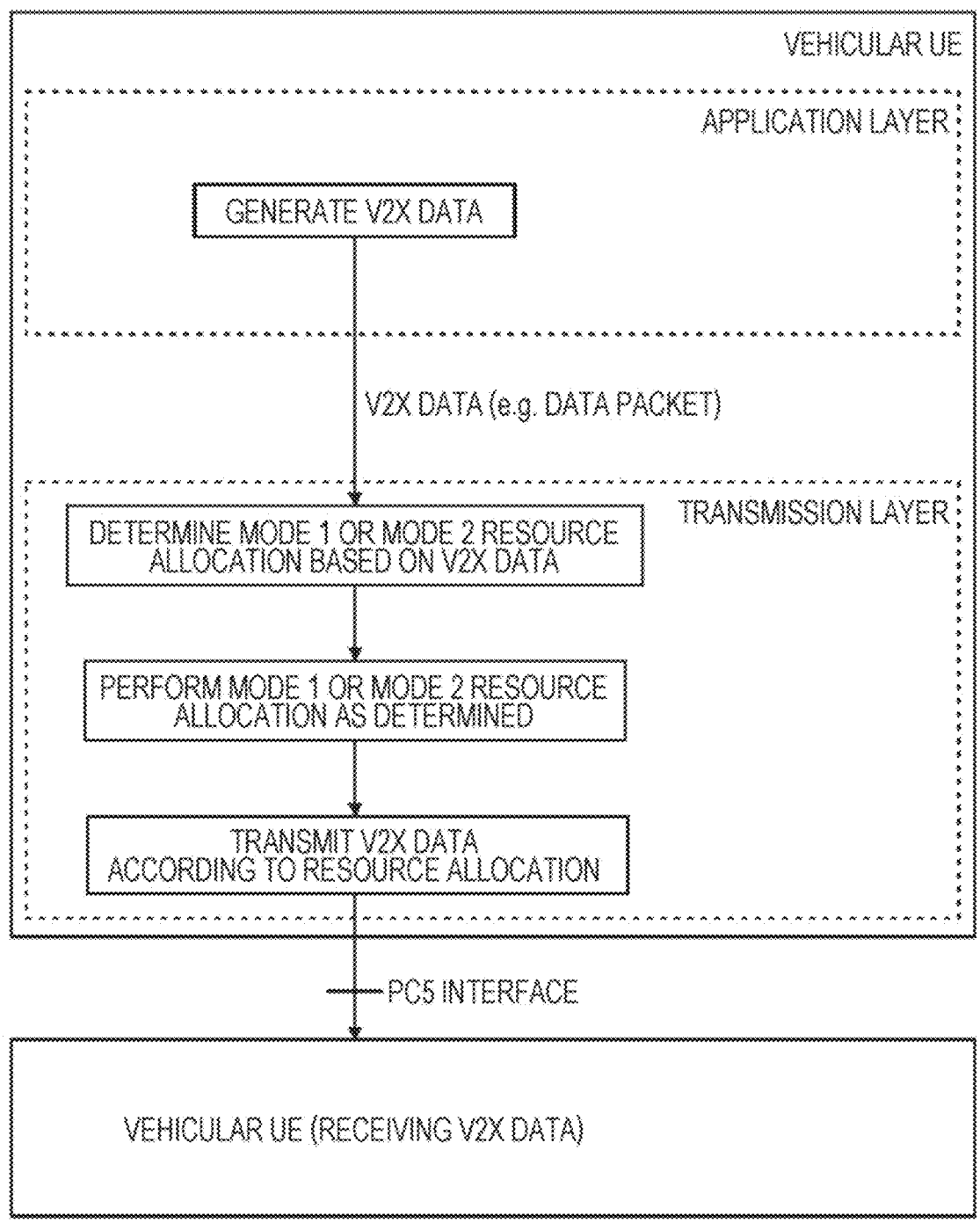
FIG. 11 is a diagram for the third embodiment, illustrating the operation of the vehicular transmitting UE.

FIG. 11 is a diagram exemplarily illustrating an implementation of the third embodiment. As apparent therefrom, the transmission layer is responsible for determining whether to use the Mode 1 or Mode 2 resource allocation based on the V2X data; e.g. based on a suitable mapping. In consequence, the transmission layer would then perform the corresponding Mode 1 or Mode 2 resource allocation as determined before, and then proceeds to transmit the V2X data according to the transmission parameters obtained by the resource allocation.

In exemplary implementations of the third embodiment, the selection of the appropriate radio resource allocation mode to be used can be based on an indication from the application layer. In other words, the application layer generating the vehicular data will indicate whether QoS shall be applied or not for the particular vehicular data. Correspondingly, a suitable QoS support indication is forwarded together with the vehicular data to the responsible transmission layer, which then, following the received indication, performs the corresponding radio resource allocation (according to Mode 1 or Mode 2) to obtain the necessary transmission parameters. In one exemplary implementation a flag could be used as the QoS support indication which is forwarded to the lower layers together with the vehicular data.

In another exemplary implementation, the PPPP can be used as the QoS support indication, by associating particular PPPP values with either the Mode 1 or Mode 2 radio resource allocation mode. Similarly, considering that the sidelink logical channels are set up considering the PPPP (for the same source destination ID) such that there is one sidelink logical channel per PPPP, certain sidelink logical channels can be configured to use Mode 1 resource allocation in order to ensure QoS compliance, while other sidelink logical channels will be configured to use Mode 2 resource allocation where the fulfillment of specific QoS requirements is not guaranteed. In other words, the vehicular UE determines the radio resource allocation mode to be applied based on the sidelink logical channel having data available for transmission.

There are several possibilities on how to configure which logical channel (respectively PPPP or particular specific data) is to use which resource allocation mode. A suitable mapping can be defined either by upper layers (the application layer generating the vehicular data) or be configured by the eNodeB. For instance, the eNodeB may broadcast a suitable mapping in its radio cell so as to be obtained by all vehicular UEs in the cell, or the eNodeB may transmit dedicated messages to vehicular UE(s) separately in said respect. As an example, certain higher priority vehicular services (such as security related transmissions or voice call related transmissions) may be configured to be transmitted with QoS support (e.g. a short packet delay budget or a low packet error loss rate) and should thus be transmitted using the Mode 1 radio resource allocation mode. Conversely, other vehicular services may not benefit from the QoS support, and thus resource allocation according to Mode 2 would be sufficient.

As a consequence, depending on the radio resource allocation mode, the vehicular UE may have to be first connected to the eNodeB. In particular, when transmitting vehicular data of a sidelink logical channel for which Mode 1 radio resource allocation is to be performed, the vehicular UE has to be connected with the eNodeB (to be able to transmit the scheduling request and/or the buffer status report), and thus has to set up first an RRC connection with the eNodeB if not already connected to the eNodeB. Then, the transmitting device may in the usual manner perform the Mode 1 resource allocation by requesting the transmission parameters from the radio base station, e.g. including transmitting first a scheduling request, and in response to being provided with suitable frequency time radio resources, transmitting a sidelink buffer status report indicating the amount of vehicular data to be transmitted (only for the sidelink logical channels associated with the Mode 1 resource allocation). As mentioned before, the eNodeB is responsible for handling the QoS requirements in connection with the vehicular data by selecting suitable transmission parameters in said respect. The transmission parameters (e.g. the frequency time resources, the modulation and coding scheme, optionally a number of total transmissions to be performed for a transport block) are then used by the transmission layer to perform the transmission of the vehicular data.

Consequently, according to the third embodiment, Mode 1 respectively Mode 2 resource allocation is performed depending on the data, and thus QoS is supported selectively depending on the data (or, put differently depending on the sidelink logical channel handling the data). It is thus possible to implement consistent QoS support for specific vehicular data (i.e. benefiting from QoS) even in the case where the Mode 2 radio resource allocation itself is not suitable to support QoS.

As a result, it might be possible that the UE performs both radio resource allocations at the same time, namely when transmitting two or more separate transport blocks (e.g. when using MIMO or when using carrier aggregation) in one subframe.

Moreover, taking into account that according to the third embodiment the configured sidelink logical channels are possibly associated with different radio resource allocation modes, the sidelink logical channel prioritization procedure needs to be adapted in said respect. In particular, after being provided with corresponding transmission parameters (including the frequency time resources to be allocated), the transmission layer usually performs a sidelink logical channel prioritization procedure so as to allocate that received frequency time radio resources to the sidelink logical channels having data available for transmission. In this case however, the sidelink LCP procedure shall only consider those sidelink logical channels that are associated to the resource allocation mode that provided the frequency time radio resources to be allocated by the sidelink LCP procedure.

For instance, assuming that the vehicular UE performed Mode 1 radio resource allocation and correspondingly received the transmission parameters from the eNodeB, the subsequent sidelink LCP procedure should only take into account those sidelink logical channels that are associated with a Mode 1 radio resource allocation such that the available frequency time radio resources are allocated on a priority basis to the Mode 1 sidelink logical channels. Conversely, assuming that the vehicular UE performed Mode 2 radio resource allocation and correspondingly autonomously determined transmission parameters, the subsequent sidelink LCP procedure should only take into account those sidelink logical channels that are associated with the Mode 2 radio resource allocation, such that the available frequency time radio resources are allocated on a priority basis to the Mode 2 sidelink logical channels.

An exemplary implementation may foresee two separate MAC entities, one responsible for performing the sidelink LCP procedure for the Mode 1 sidelink logical channels, and the other one responsible for performing the sidelink LCP procedure for the Mode 2 sidelink logical channels. Alternatively, only one MAC entity may be provided in the vehicular UE, which is then alternately responsible for performing the sidelink LCP procedure for either Mode 1 or Mode 2 sidelink logical channels as necessary.

Fourth Embodiment

In the following a fourth embodiment is presented which deals with similar problems as the one solved by the previous embodiments. In particular, an improved QoS support for the transmission of vehicular data via the sidelink interface shall be provided.

In specific implementations of the first and second embodiments, the further QoS parameter, UE-PC5-AMBR (aggregate maximum bit rate of for the sidelink interface), was considered to be used for the UE autonomous resource allocation, specifically in the sidelink logical channel prioritization procedure performed by the vehicular UE to allocate radio resources to the various sidelink logical channels having vehicular data available for transmission.

According to the fourth embodiment, a further QoS parameter is foreseen, namely a V2X-specific UE-PC5-AMBR, defining a maximum throughput that is allowed for the UE for transmissions of vehicular data over the sidelink interface. Correspondingly, the UE is limited to a particular, average, maximum bit rate when transmitting vehicular data via the sidelink interface. Unlike in the previously mentioned UE-PC5-AMBR, this new QoS parameter (may be e.g. termed UE-PC5-V2X-AMBR) only refers to vehicular data, i.e. to sidelink logical channels carrying vehicular data; it should not be applied to limit the throughput of transmissions of non-vehicular data via the sidelink interface. The UE-PC5-V2X-AMBR is thus specific to the UE, to the sidelink interface as well as to the V2X sidelink logical channels.

The UE-PC5-V2X-AMBR can be provided to the vehicular UE in various ways. According to an exemplary implementation of the fourth embodiment, the eNodeB can transmit the parameter in a corresponding dedicated message, e.g. during the attach procedure (in a similar manner as described for the parameter UE-PC5-AMBR in the first and second embodiment). In particular, during the attach procedure, the MME obtains the UE-PC5-V2X-AMBR according to a UE subscription from the HSS and the network operator's policy. The MME in turn can forward this information during the initial context setup procedure for the UE, to the eNodeB, which then can forward the information further to the UE either in a broadcast or dedicated message. Alternatively, the UE can be provided with the UE-PC5-V2X-AMBR from a higher layer (application) e.g. based on some pre-configuration.

Instead of the UE-PC5-AMBR, the new QoS parameter UE-PC5-V2X-AMBR can be used during the sidelink logical channel prioritization procedure so as to limit the amount of vehicular data per time that can be transmitted by the UE via the sidelink interface. In one exemplary implementation, a token bucket algorithm can be used in said respect. A token bucket can be defined for sidelink logical channels carrying vehicular data, such that radio resources can only be allocated to the V2X sidelink logical channels as long as the bucket is not empty (i.e. >0). However, also other implementations not using a token bucket algorithm may be foreseen to apply the limitation given by the UE-PC5-V2X-AMBR parameter. A specific exemplary implementation of such an adapted sidelink LCP procedure is given in the following. The corresponding lower layer (i.e. MAC) shall allocate resources to the (relevant vehicular) sidelink logical channels in the following steps:

1. All the sidelink logical channels having data available for transmission are served in decreasing order of priority until either the data for the sidelink logical channel(s) or the SL grant is exhausted or the bucket is empty, whichever comes first.

2. The MAC entity shall decrement the bucket level by the total size of MAC SDUs served for the vehicular sidelink logical channels in the above step.

The UE-PC5-V2X-AMBR would not be considered in the sidelink logical channel prioritization procedure in connection with the non-vehicular sidelink logical channels, such as sidelink logical channels carrying data of e.g. MCPTT, Mission-Critical Push To Talk. Put differently, there would be no limit for the transmission of non-vehicular data, and the sidelink LCP procedure would allocate available frequency time radio resources without such a limit to the non-vehicular sidelink logical channels. Alternatively, the previously discussed UE-PC5-AMBR could be used for limiting the throughput of non-vehicular data during the sidelink LCP procedure. Reference is made to the previous description in connection with the first embodiment.

The UE according to an embodiment would not multiplex vehicular and non-vehicular data in one transport block (TB) for the case that the UE has vehicular and non-vehicular sidelink logical channels (e.g. MCPTT traffic or Voice call) concurrently established for transmission on the PC5 interface. Hence according to an implementation, the UE would only consider certain sidelink logical channels—being it either only all vehicular or all non-vehicular sidelink logical cannels—when performing resource selection and logical channel prioritization procedure. For that purpose the lower layers should be aware of which sidelink logical channels are vehicular sidelink logical channels or non-vehicular sidelink logical channels respectively whether a data packet provided by the application layer carries vehicular data or non-vehicular data. This information is according to one exemplary implementation provided by the application layer to the lower (transmission) layers e.g. together with the data packet. Alternatively, the PPPP could indicate whether a data packet contains vehicular/non-vehicular data, i.e. certain PPPP values are reserved for vehicular data. As another alternative, the Source Layer-2 ID or Destination Layer-2 ID could indicate whether the data packet(s) of a sidelink logical channel carry vehicular/non-vehicular data.

The vehicular UE is thus able to enforce the UE-PC5-V2X-AMBR parameter also for the Mode 2 radio resource allocation.

Further Embodiments

Four different embodiments were described above on how to implement QoS support for scenarios where V2X data is to be transmitted via the sidelink interface. Various embodiments of the above may be combined together as well, as will be explained in the following.

The fourth embodiment improves the sidelink LCP procedure performed by the vehicular UE by additionally considering the UE-PC5-V2X-AMBR (i.e. a V2X-specific aggregate maximum bit rate for vehicular data transmissions via the PC5 interface). This improvement of the fourth embodiment can be combined with any of the first, second and third embodiments.

For example in the first and second embodiments, the UE-PC5-V2X-AMBR would be a parameter which the vehicular UE would additionally take into account when allocating the frequency time radio resources (e.g. obtained by performing the radio resource allocation according to the first/second embodiment) to the various V2X sidelink logical channels. The UE-PC5-V2X-AMBR could either replace the UE-PC5-AMBR explained in the first embodiment, or may be used for limiting the transmission throughput of vehicular data while the UE-PC5-AMBR parameter could be used for limiting the transmission throughput of non-vehicular data during the sidelink LCP procedure.

Moreover, for the third embodiment, the UE-PC5-V2X-AMBR may be used in the sidelink logical channel prioritization procedure performed by the vehicular UE after obtaining the corresponding transmission parameters from the eNodeB. Although it may be assumed that for the Mode 1 resource allocation, a corresponding limitation given by the UE-PC5-V2X-AMBR would already be applied by the eNodeB, it is equally possible to also implement a corresponding limitation in the sidelink LCP procedure performed by the vehicular UE. Likewise, for Mode 2 resource allocation, although no other QoS parameters were considered during resource allocation, the UE-PC5-V2X-AMBR could still be used in the sidelink LCP procedure.

The third embodiment basically allows the resource allocation to be dependent on the data to be transmitted, or put differently provides a solution where the resource allocation can be specific to the particular sidelink logical channel. Thereby it is possible to enforce the QoS requirements for particular data, by associating that data (or rather the corresponding sidelink logical channel) with the Mode 1 resource allocation; in the third embodiment it is exemplarily assumed that the Mode 2 resource allocation does not—or at least only in a limited manner —support QoS. It is possible to combine the first and second embodiments with the third embodiment. Although the first and second embodiments provide solutions were also the Mode 2 resource allocation performed by the vehicular UE considers QoS parameters, it might still be in the interest of the eNodeB to have control over the vehicular UE such that the vehicular UE performs a particular resource allocation mode for specific vehicular data. Furthermore, the QoS support indication mentioned in connection with the third embodiment can be seen as a further QoS parameter forwarded together with the vehicular data to the lower layers in the various implementations of the first embodiment. On the other hand, as regards the second embodiment, the resource mode indication could be a further QoS parameter in the QoS classes/configurations. Correspondingly, in both the first and second embodiments, the transmission layer would perform the corresponding resource allocation mode as indicated by the QoS parameter.

Further Embodiments

According to a first aspect, a transmitting device is provided for transmitting vehicular data via a sidelink interface to one or more receiving devices. The transmitting device performs autonomous radio resource allocation for transmitting the vehicular data via the sidelink interface. An application layer of the transmitting device generates the vehicular data and forwards the vehicular data together with a priority indication and one or more quality of service parameters to a transmission layer responsible for transmission of the vehicular data via the sidelink interface. The transmission layer performs autonomous radio resource allocation based on the received priority indication and the one or more quality of service parameters. The transmission layer transmits the vehicular data via the sidelink interface to the one or more receiving devices according to the performed autonomous radio resource allocation.

According to a second aspect which is provided in addition to the first aspect, the one or more quality of service parameters indicate at least one of:
- a packet delay budget: indicating an upper time limit allowed for transmitting the vehicular data upon becoming available for transmission,
- a packet error loss rate: indicating the allowed rate of lost vehicular data,
- a resource type: having or not having a guaranteed bit rate.

According to a third aspect which is provided in addition to one of the first to second aspects, performing the autonomous radio resource allocation for the transmission of the vehicular data comprises:
- selecting frequency-time radio resources, and/or
- selecting a modulation and coding scheme, optionally based on a packet error loss rate, and/or
- determining a repetition number indicating the number of transmissions of the vehicular data, optionally based on a packet error loss rate.

According to a fourth aspect in addition to one of the first to third aspects, the transmitting device supports autonomous radio resource allocation and radio base station controlled radio resource allocation for transmitting the vehicular data via the sidelink interface. The transmitting device is configured to perform autonomous radio resource allocation and radio base station controlled radio resource allocation depending on the data to be transmitted. The transmission layer determines which radio resource allocation to use for transmitting the vehicular data depending on the vehicular data. The transmission layer performs the autonomous radio resource allocation and transmits the vehicular data according to the performed autonomous radio resource allocation.

According to a fifth aspect in addition to one of the first to fourth aspects, an aggregated maximum bit rate is defined for the transmitting device, indicating the maximum-allowed total data throughput of the transmitting device via the sidelink interface. Optionally. the aggregated maximum bit rate is configured by a radio base station controlling the transmitting device. The aggregated maximum bit rate is used for a sidelink logical channel prioritization procedure as a limit to the amount of data throughput by the transmitting device via the sidelink interface, the sidelink logical channel prioritization procedure being performed by the transmitting device for allocating radio resources to generate a data packet carrying the vehicular data.

According to a sixth aspect in addition to one of the first to fifth aspects, the transmitting device determines whether the packet delay budget is exceeded for the vehicular data, and in the positive case, discards the vehicular data.

According to the seventh aspect, a method is provided for transmitting vehicular data from a transmitting device via a sidelink interface to one or more receiving devices. The transmitting device performs autonomous radio resource allocation for transmitting the vehicular data via the sidelink interface, The method comprises the following steps performed by the transmitting device. The vehicular data is generated in an application layer and forwarded together with a priority indication and one or more quality of service parameters to a transmission layer responsible for transmission of the vehicular data via the sidelink interface. The transmission layer performs autonomous radio resource allocation based on the received priority indication and the one or more quality of service parameters. The transmission layer transmits the vehicular data via the sidelink interface to the one or more receiving devices according to the performed autonomous radio resource allocation.

According to eighth aspect in addition to the seventh aspect, the one or more quality of service parameters indicate at least one of:
- a packet delay budget: indicating an upper time limit allowed for transmitting the vehicular data upon becoming available for transmission,
- a packet error loss rate: indicating the allowed rate of lost vehicular data,
- a resource type: having or not having a guaranteed bit rate.

According to ninth aspect in addition to the seventh or eighth aspect, performing the autonomous radio resource allocation for the transmission of the vehicular data comprises:
- selecting frequency-time radio resources, and/or
- selecting a modulation and coding scheme, optionally based on a packet error loss rate, and/or
- determining a repetition number indicating the number of transmissions of the vehicular data, optionally based on a packet error loss rate.

According to tenth aspect in addition to one of the seventh to ninth aspects, an aggregated maximum bit rate is defined for the transmitting device, indicating the maximum-allowed total data throughput of the transmitting device via the sidelink interface. Optionally, the aggregated maximum bit rate is configured by a radio base station controlling the transmitting device. The aggregated maximum bit rate is used for a sidelink logical channel prioritization procedure as a limit to the amount of data throughput by the transmitting device via the sidelink interface, the sidelink logical channel prioritization procedure being performed by the transmitting device for allocating radio resources to generate a data packet carrying the vehicular data.

According to eleventh aspect in addition to one of the seventh to tenth aspects, the method further comprising the step of, determining by the transmitting device whether the packet delay budget is exceeded for the vehicular data, and in the positive case, discarding the vehicular data.

According to a twelfth aspect, a transmitting device is provided for transmitting vehicular data via a sidelink interface to one or more receiving devices. The transmitting device performs autonomous radio resource allocation for transmitting the vehicular data via the sidelink interface. A receiver of the transmitting device receives system information broadcast by a radio base station in its radio cell, the system information comprising one or more quality of service configurations. An application layer of the transmitting device generates the vehicular data and forwards the generated vehicular data together with an indication to a transmission layer responsible for transmission of the vehicular data via the sidelink interface. The transmission layer determines one of the received one or more quality of service configurations depending on the indication received together with the vehicular data. The transmission layer performs the autonomous radio resource allocation based on the determined one quality of service configuration. The transmission layer transmits the vehicular data via the sidelink interface to the one or more receiving devices according to the performed autonomous radio resource allocation.

According to a thirteenth aspect provided in addition to the twelfth aspect, the system information is received in a system information block specific to vehicular communication.

According to a fourteenth aspect provided in addition to the twelfth or thirteenth aspect, each of the one or more quality of service configurations indicates at least one of:

a packet delay budget: indicating an upper time limit allowed for transmitting the vehicular data upon becoming available for transmission, a packet error loss rate: indicating the allowed rate of lost vehicular data a resource type: having or not having a guaranteed bit rate.

According to a fifteenth aspect provided in addition to one of the twelfth to fourteenth aspects, the system information further includes an aggregated maximum bit rate, indicating the maximum allowed total data throughput of the transmitting device via the sidelink interface. The aggregated maximum bit rate is used for a sidelink logical channel prioritization procedure as a limit to the amount of data throughput by the transmitting device via the sidelink interface, the sidelink logical channel prioritization procedure being performed by the transmitting device for allocating radio resources to generate a data packet carrying the vehicular data.

According to a sixteenth aspect provided in addition to one of the twelfth to fifteenth aspects, the indication transmitted together with the vehicular data to the transmission layer is a priority indication, indicating the priority of the vehicular data. The transmission layer determines the one quality of service configuration using the received priority indication and a mapping stored in the transmitting device associating each of the one or more quality of service configurations with a priority indication value. Optionally, the mapping is received in the system information broadcast by the radio base station in its radio cell or provided by the application layer.

According to a seventeenth aspect provided in addition to one of the twelfth to sixteenth aspects, the application layer determines which quality of service configuration to use and generates a quality of service class indication indicating the determined one quality of service configuration. The indication transmitted together with the vehicular data to the transmission layer is the generated quality of service class indication. Optionally, a priority indication is transmitted together with the vehicular data to the transmission layer, the priority indication indicating the priority of the vehicular data.

According to an eighteenth aspect, a method is provided method for transmitting vehicular data from a transmitting device via a sidelink interface to one or more receiving devices. The transmitting device performs autonomous radio resource allocation for transmitting the vehicular data via the sidelink interface. The method comprises the following steps performed by the transmitting device. System information broadcast by a radio base station in its radio cell is received by the transmitting device, the system information comprising one or more quality of service configurations. An application layer generates the vehicular data and forwards the generated vehicular data together with an indication to a transmission layer responsible for transmission of the vehicular data via the sidelink interface. The transmission layer determines one of the received one or more quality of service configurations depending on the indication received together with the vehicular data and performs the autonomous radio resource allocation based on the determined one quality of service configuration. The vehicular data is transmitted via the sidelink interface to the one or more receiving devices according to the performed autonomous radio resource allocation.

According to a nineteenth aspect provided in addition to the eighteenth aspect, each of the one or more quality of service configurations indicates at least one of:

a packet delay budget: indicating an upper time limit allowed for transmitting the vehicular data upon becoming available for transmission, a packet error loss rate: indicating the allowed rate of lost vehicular data a resource type: having or not having a guaranteed bit rate.

According to a twentieth aspect provided in addition to the eighteenth or nineteenth aspect, the system information further includes an aggregated maximum bit rate, indicating the maximum allowed total data throughput of the transmitting device via the sidelink interface. The aggregated maximum bit rate is used for a sidelink logical channel prioritization procedure as a limit to the amount of data throughput by the transmitting device via the sidelink interface, the sidelink logical channel prioritization procedure being performed by the transmitting device for allocating radio resources to generate a data packet carrying the vehicular data.

According to a 21'st aspect provided in addition to one of the eighteenth to twentieth aspects, the indication transmitted together with the vehicular data to the transmission layer is a priority indication, indicating the priority of the vehicular data. The transmission layer determines the one quality of service configuration using the received priority indication and a mapping stored in the transmitting device associating each of the one or more quality of service configurations with a priority indication value. Optionally, the mapping is received in the system information broadcast by the radio base station in its radio cell or provided by the application layer.

According to a 22'nd aspect provided in addition to one of the eighteenth to 21'st aspect, the method further comprises the steps of determining by the application layer which quality of service configuration to use and generating by the application layer a quality of service class indication indicating the determined one quality of service configuration. The indication transmitted together with the vehicular data to the transmission layer is the generated quality of service class indication. Optionally, the method further comprises the step of transmitting a priority indication together with the vehicular data to the transmission layer, the priority indication indicating the priority of the vehicular data.

According to a 23'rd aspect, a transmitting device is provided for transmitting vehicular data via a sidelink interface to one or more receiving devices. The transmitting device supports autonomous radio resource allocation and radio base station controlled radio resource allocation for transmitting the vehicular data via the sidelink interface. The transmitting device is configured to perform autonomous radio resource allocation and radio base station controlled radio resource allocation depending on the data to be transmitted. An application layer of the transmitting device generates first vehicular data and second vehicular data. The application layer forwards the first and second vehicular data to a transmission layer responsible for transmission of vehicular data via the sidelink interface. The transmission layer determines which radio resource allocation to use for transmitting the first vehicular data depending on the first vehicular data and determines which radio resource allocation to use for transmitting the second vehicular data depending on the second vehicular data. The transmission layer performs for the first vehicular data the determined radio resource allocation and transmits the first vehicular data to the one or more receiving devices via the sidelink interface according to the determined radio resource allocation. The transmission layer performs for the second vehicular data the determined radio resource allocation and transmits the second vehicular data to the one or more receiving devices via the sidelink interface according to the determined radio resource allocation.

According to a 24'th aspect provided in addition to the 23'rd aspect, one or more quality of service requirements for the transmission of data are considered when performing the radio base station controlled radio resource allocation and are not considered when performing the autonomous radio resource allocation.

According to a 25'th aspect provided in addition to the 23'rd or 24'th aspect, each of a plurality of sidelink logical channels is associated with either the autonomous radio resource allocation or the radio base station controlled radio resource allocation. The transmitting device determines which radio resource allocation to use for transmitting the vehicular data based on the sidelink logical channel to which the vehicular data belongs. Optionally, the plurality of sidelink logical channels is set up for transmitting vehicular data and is configured based on a priority indication provided by the application layer together with the vehicular data.

According to a 26'th aspect provided in addition to one of the 23'rd to 25'th aspect, the association between each of the plurality of sidelink logical channels and the particular radio resource allocation is configured by:
 a radio base station controlling the transmitting device, optionally wherein the radio base station transmits to the transmitting device a broadcast or dedicated message including the information on the association, or
 the application layer of the transmitting device.

According to a 27'th aspect provided in addition to one of the 23'rd to 26'th aspect, the radio base station controlled radio resource allocation for the transmission of the vehicular data comprises:
 connecting to the radio base station in case the transmitting device is not connected to the radio base station,
 requesting transmission parameters from the radio base station by transmitting a scheduling request and/or a sidelink buffer status report indicating the amount of vehicular data to be transmitted using the radio base station controlled radio resource allocation,
 receiving, in response to the request, transmission parameters from the radio base station for transmitting the vehicular data, optionally wherein the transmission parameters comprise at least one of frequency-time radio resources, a modulation and coding scheme, and a repetition number indicating the number of transmissions of the vehicular data.

The autonomous radio resource allocation for the transmission of the first vehicular data comprises:
 selecting frequency-time radio resources, and/or
 selecting a modulation and coding scheme, and/or
 determining a repetition number indicating the number of transmissions of the vehicular data.

According to a 28'th aspect, a method is provided for transmitting vehicular data from a transmitting device via a sidelink interface to one or more receiving devices. The transmitting device supports autonomous radio resource allocation and radio base station controlled radio resource allocation for transmitting the vehicular data via the sidelink interface. The transmitting device is configured to perform autonomous radio resource allocation and radio base station controlled radio resource allocation depending on the data to be transmitted. The method comprises the following steps performed by the transmitting device. The application layer of the transmitting device generates first vehicular data and second vehicular data and forwards the first and second vehicular data to a transmission layer responsible for transmission of vehicular data via the sidelink interface. The transmission layer of the transmitting device determines which radio resource allocation to use for transmitting the first vehicular data depending on the first vehicular data. Further, the transmission layer determines which radio resource allocation to use for transmitting the second vehicular data depending on the second vehicular data. The transmission layer performs for the first vehicular data the determined radio resource allocation and transmits the first vehicular data to the one or more receiving devices via the sidelink interface according to the determined radio resource allocation. The transmission layer performs for the second vehicular data the determined radio resource allocation and transmits the second vehicular data to the one or more receiving devices via the sidelink interface according to the determined radio resource allocation.

According to a 29'th aspect provided in addition to the 28'th aspect, one or more quality of service requirements for the transmission of data are considered when performing the radio base station controlled radio resource allocation and are not considered when performing the autonomous radio resource allocation.

According to a 30'th aspect provided in addition to the 28'th or 29'th aspect, each of a plurality of sidelink logical channels is associated with either the autonomous radio resource allocation or the radio base station controlled radio resource allocation. The method further comprising the step of determining by the transmitting device which radio resource allocation to use for transmitting the vehicular data based on the sidelink logical channel to which the vehicular data belongs. Optionally, the plurality of sidelink logical channels are set up for transmitting vehicular data and are configured based on a priority indication provided by the application layer together with the vehicular data.

According to a 31'st aspect provided in addition to one of the 28'th to 30'th aspects, the association between each of the plurality of sidelink logical channels and the particular radio resource allocation is configured by:
 a radio base station controlling the transmitting device, optionally wherein the radio base station transmits to the transmitting device a broadcast or dedicated message including the information on the association, or
 the application layer of the transmitting device.

According to a 32'nd aspect provided in addition to one of the 28'th to 31'st aspects, the radio base station controlled radio resource allocation for the transmission of the vehicular data comprises:
 connecting to the radio base station in case the transmitting device is not connected to the radio base station,
 requesting transmission parameters from the radio base station by transmitting a scheduling request and/or a sidelink buffer status report indicating the amount of vehicular data to be transmitted using the radio base station controlled radio resource allocation,
 receiving, in response to the request, transmission parameters from the radio base station for transmitting the vehicular data, optionally wherein the transmission parameters comprise at least one of frequency-time radio resources, a modulation and coding scheme, and a repetition number indicating the number of transmissions of the vehicular data.

The autonomous radio resource allocation for the transmission of the first vehicular data comprises:
 selecting frequency-time radio resources, and/or selecting a modulation and coding scheme, and/or
determining a repetition number indicating the number of transmissions of the vehicular data.

According to a 33'rd aspect, a transmitting device is provided for transmitting vehicular data via a sidelink interface to one or more receiving devices. The transmitting device performs autonomous radio resource allocation for transmitting the vehicular data via the sidelink interface. An aggregate maximum bit rate is defined for the transmitting device, indicating the maximum-allowed total vehicular data throughput of the transmitting device via the sidelink interface. An application layer of the transmitting device generates the vehicular data and forwards the vehicular data to a transmission layer responsible for transmission of the vehicular data via the sidelink interface. The transmission layer of the transmitting device performs the autonomous radio resource allocation for the vehicular data, including the selection of frequency-time radio resources. The transmission layer performs a sidelink logical channel prioritization procedure for allocating the selected frequency-time radio resources to generate a data packet carrying the vehicular data. The sidelink logical channel procedure considers the aggregate maximum bit rate as a limit to the throughput of vehicular data to be transmitted by the transmitting device via the sidelink interface. The transmission layer transmits the generated data packet carrying the vehicular data to the one or more receiving devices using the allocated frequency-time radio resources.

According to a 34'th aspect provided in addition to the 33'rd aspect, the aggregate maximum bit rate is used in the sidelink logical channel prioritization as an upper limit parameter of a token bucket in a token bucket algorithm for the vehicular data.

According to a 35'th aspect provided in addition to the 33'rd or 34'th aspect, the application layer generates non-vehicular data, and the sidelink logical channel prioritization procedure does not consider the aggregate maximum bit rate when allocating radio resources to generate a data packet carrying the non-vehicular data.

According to a 36'th aspect provided in addition to any of the previous aspect, the transmitting device is a vehicular mobile terminal, a road side unit, or a mobile terminal.

According to a 37'th aspect, a method is provided for transmitting vehicular data from a transmitting device via a sidelink interface to one or more receiving devices. The transmitting device performs autonomous radio resource allocation for transmitting the vehicular data via the sidelink interface. An aggregate maximum bit rate is defined for the transmitting device, indicating the maximum-allowed total vehicular data throughput of the transmitting device via the sidelink interface. The method comprises the following steps performed by the transmitting device. An application layer of the transmitting device generates the vehicular data and forwards the vehicular data to a transmission layer responsible for transmission of the vehicular data via the sidelink interface. The transmission layer of the transmitting device performs the autonomous radio resource allocation for the vehicular data, including the selection of frequency-time radio resources. The transmission layer performs a sidelink logical channel prioritization procedure for allocating the selected frequency-time radio resources to generate a data packet carrying the vehicular data. The sidelink logical channel procedure considers the aggregate maximum bit rate as a limit to the throughput of vehicular data to be transmitted by the transmitting device via the sidelink interface. The transmission layer transmits the generated data packet carrying the vehicular data to the one or more receiving devices using the allocated frequency-time radio resources.

According to a 38'th aspect provided in addition to the 37'th aspect, the aggregate maximum bit rate is used in the sidelink logical channel prioritization as an upper limit parameter of a token bucket in a token bucket algorithm for the vehicular data.

According to a 39'th aspect provided in addition to the 37'th or 38'th aspect, the application layer generates non-vehicular data, and the sidelink logical channel prioritization procedure does not consider the aggregate maximum bit rate when allocating radio resources to generate a data packet carrying the non-vehicular data.

In one general aspect, the techniques disclosed here feature a method for transmitting vehicular data from a transmitting device via a sidelink interface to one or more receiving devices. The transmitting device performs autonomous radio resource allocation for transmitting the vehicular data via the sidelink interface. The method comprises the following steps performed by the transmitting device. The vehicular data is generated in an application layer and forwarded together with a priority indication and one or more quality of service parameters to a transmission layer responsible for transmission of the vehicular data via the sidelink interface. The transmission layer performs autonomous radio resource allocation based on the received priority indication and the one or more quality of service parameters. The transmission layer transmits the vehicular data via the sidelink interface to the one or more receiving devices according to the performed autonomous radio resource allocation.

In one general aspect, the techniques disclosed here feature a transmitting device for transmitting vehicular data via a sidelink interface to one or more receiving devices. The transmitting device performs autonomous radio resource allocation for transmitting the vehicular data via the sidelink interface. A receiver of the transmitting device receives system information broadcast by a radio base station in its radio cell, the system information comprising one or more quality of service configurations. An application layer of the transmitting device, generates the vehicular data and forwards the generated vehicular data together with an indication to a transmission layer responsible for transmission of the vehicular data via the sidelink interface. The transmission layer determines one of the received one or more quality of service configurations depending on the indication received together with the vehicular data. The transmission layer performs the autonomous radio resource allocation based on the determined one quality of service configuration. The transmission layer transmits the vehicular data via the sidelink interface to the one or more receiving devices according to the performed autonomous radio resource allocation.

In one general aspect, the techniques disclosed here feature a method for transmitting vehicular data from a transmitting device via a sidelink interface to one or more receiving devices. The transmitting device performs autonomous radio resource allocation for transmitting the vehicular data via the sidelink interface. The method comprises the following steps performed by the transmitting device. System information broadcast by a radio base station in its radio cell is received by the transmitting device, the system information comprising one or more quality of service configurations. The vehicular data is generated in an application layer and forwarded together with an indication to a transmission layer responsible for transmission of the vehicular data via the sidelink interface. The transmission layer determines one of the received one or more quality of service configurations depending on the indication received together with the vehicular data, and performs the autonomous radio resource allocation based on the determined one quality of service configuration. The vehicular data is transmitted via the sidelink interface to the one or more receiving devices according to the performed autonomous radio resource allocation.

In one general aspect, the techniques disclosed here feature a transmitting device for transmitting vehicular data via a sidelink interface to one or more receiving devices. The transmitting device performs autonomous radio resource allocation for transmitting the vehicular data via the sidelink interface. An aggregate maximum bit rate is defined for the transmitting device, indicating the maximum allowed total vehicular data throughput of the transmitting device via the sidelink interface. An application layer of the transmitting device generates the vehicular data and forwards the vehicular data to a transmission layer responsible for transmission of the vehicular data via the sidelink interface. The transmission layer performs the autonomous radio resource allocation for the vehicular data, including the selection of frequency-time radio resources. The transmission layer performs a sidelink logical channel prioritization procedure for allocating the selected frequency-time radio resources to generate a data packet carrying the vehicular data, the sidelink logical channel procedure considering the aggregate maximum bit rate as a limit to the throughput of vehicular data to be transmitted by the transmitting device via the sidelink interface. The transmission layer transmits the generated data packet carrying the vehicular data to the one or more receiving devices using the allocated frequency time radio resources.

In one general aspect, the techniques disclosed here feature a method for transmitting vehicular data from a transmitting device via a sidelink interface to one or more receiving devices. The transmitting device performs autonomous radio resource allocation for transmitting the vehicular data via the sidelink interface. An aggregate maximum bit rate is defined for the transmitting device, indicating the maximum-allowed total vehicular data throughput of the transmitting device via the sidelink interface. The method comprises the following steps performed by the transmitting device. An application layer generates the vehicular data, which is to a transmission layer responsible for transmission of the vehicular data via the sidelink interface. The transmission layer performs the autonomous radio resource allocation for the vehicular data, including the selection of frequency-time radio resources. The transmission layer performs a sidelink logical channel prioritization procedure for allocating the selected frequency-time radio resources to generate a data packet carrying the vehicular data, the sidelink logical channel procedure considering the aggregate maximum bit rate as a limit to the throughput of vehicular data to be transmitted by the transmitting device via the sidelink interface. The transmission layer transmits the generated data packet carrying the vehicular data to the one or more receiving devices using the allocated frequency-time radio resources.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

What is claimed is:

1. A communication apparatus comprising:
   circuitry, which, in operation,
      obtains one or more quality of service configurations provisioned in the communication apparatus;
      forwards vehicular data together with a priority indication from an application layer to a transmission layer;
      determines, in the transmission layer, one of the one or more quality of service configurations depending on the priority indication forwarded from the application layer; and
      performs autonomous radio resource allocation for transmitting the vehicular data via a sidelink interface based on the determined one quality of service configuration, and
   a transmitter, which is coupled to the circuitry and which, in operation, transmits the vehicular data via the sidelink interface to one or more receiving apparatuses according to the autonomous radio resource allocation,
   wherein, in case different sidelink logical channels are multiplexed in one transport block (TB) to transmit the vehicular data, transmission of the TB via the sidelink interface is performed based on a sidelink logical channel associated with a highest priority indication among the different sidelink logical channels associated with priority indications.

2. The communication apparatus according to claim 1, wherein each of the one or more quality of service configurations indicates at least one of:
a packet delay budget: indicating an upper time limit allowed for transmitting the vehicular data upon becoming available for transmission,
a packet error loss rate: indicating an allowed rate of lost vehicular data,
a resource type: having or not having a guaranteed bit rate.

3. The communication apparatus according to claim 1, wherein the priority indication forwarded together with the vehicular data to the transmission layer indicates a priority of the vehicular data, and
wherein the one quality of service configuration is determined based on the priority indication and a mapping stored in the communication apparatus associating each of the one or more quality of service configurations with a priority indication value.

4. The communication apparatus according to claim 3, comprising:
a receiver, which, in operation, receives the mapping in system information broadcast from a radio base station.

5. The communication apparatus according to claim 3, comprising:
a receiver, which, in operation, receives, at the transmission layer, the mapping from the application layer.

6. The communication apparatus according to claim 1, wherein the circuitry:
generates a quality of service class indication (QCI) indicating the determined one quality of service configuration,
wherein the priority indication forwarded together with the vehicular data to the transmission layer corresponds to the generated QCI.

7. The communication apparatus according to claim 1, wherein each of the one or more quality of service configurations is associated with a quality of service class identifier (QCI) value.

8. The communication apparatus according to claim 7, wherein the priority indication associated with the vehicular data is used to determine a QCI value associated with the priority indication and to determine the one quality of service configuration associated with the determined QCI value.

9. A method implemented in a communication apparatus, the method comprising:
obtaining one or more quality of service configurations provisioned in the communication apparatus;
forwarding vehicular data together with a priority indication from an application layer to a transmission layer;
determining, in the transmission layer, one of the one or more quality of service configurations depending on the priority indication forwarded from the application layer,
performing autonomous radio resource allocation for transmitting the vehicular data via a sidelink interface based on the determined one quality of service configuration; and
transmitting the vehicular data via the sidelink interface to one or more receiving apparatuses according to the autonomous radio resource allocation,
wherein, in case different sidelink logical channels are multiplexed in one transport block (TB) to transmit the vehicular data, transmission of the TB via the sidelink interface is performed based on a sidelink logical channel associated with a highest priority indication among the different sidelink logical channels associated with priority indications.

10. The method according to claim 9, wherein each of the one or more quality of service configurations indicates at least one of:
a packet delay budget: indicating an upper time limit allowed for transmitting the vehicular data upon becoming available for transmission,
a packet error loss rate: indicating an allowed rate of lost vehicular data,
a resource type: having or not having a guaranteed bit rate.

11. The method according to claim 9,
wherein the priority indication forwarded together with the vehicular data to the transmission layer indicates a priority of the vehicular data, and
wherein the one quality of service configuration is determined based on the priority indication and a mapping stored in the transmitting device associating each of the one or more quality of service configurations with a priority indication value.

12. The method according to claim 11, comprising:
receiving the mapping in system information broadcast from a radio base station.

13. The method according to claim 11, comprising:
the transmission layer receiving the mapping from the application layer.

14. The method according to claim 9, comprising:
generating a quality of service class indication (QCI) indicating the determined one quality of service configuration,
wherein the priority indication forwarded together with the vehicular data to the transmission layer corresponds to the generated QCI.

15. The method according to claim 9, wherein each of the one or more quality of service configurations is associated with a quality of service class identifier (QCI) value.

16. The method according to claim 15, wherein the priority indication associated with the vehicular data is used to determine a QCI value associated with the priority indication and to determine the one quality of service configuration associated with the determined QCI value.

* * * * *